Sept. 12, 1961      S. BRAND      2,999,592
MANUALLY CONTROLLED RECORD SORTING MACHINE
Filed Feb. 9, 1955      18 Sheets-Sheet 1

INVENTOR
SAMUEL BRAND
BY *J. W. Lowritzer*
ATTORNEY

Sept. 12, 1961 S. BRAND 2,999,592
MANUALLY CONTROLLED RECORD SORTING MACHINE
Filed Feb. 9, 1955 18 Sheets-Sheet 3

INVENTOR
SAMUEL BRAND
BY
J. W. Romnitzler
ATTORNEY

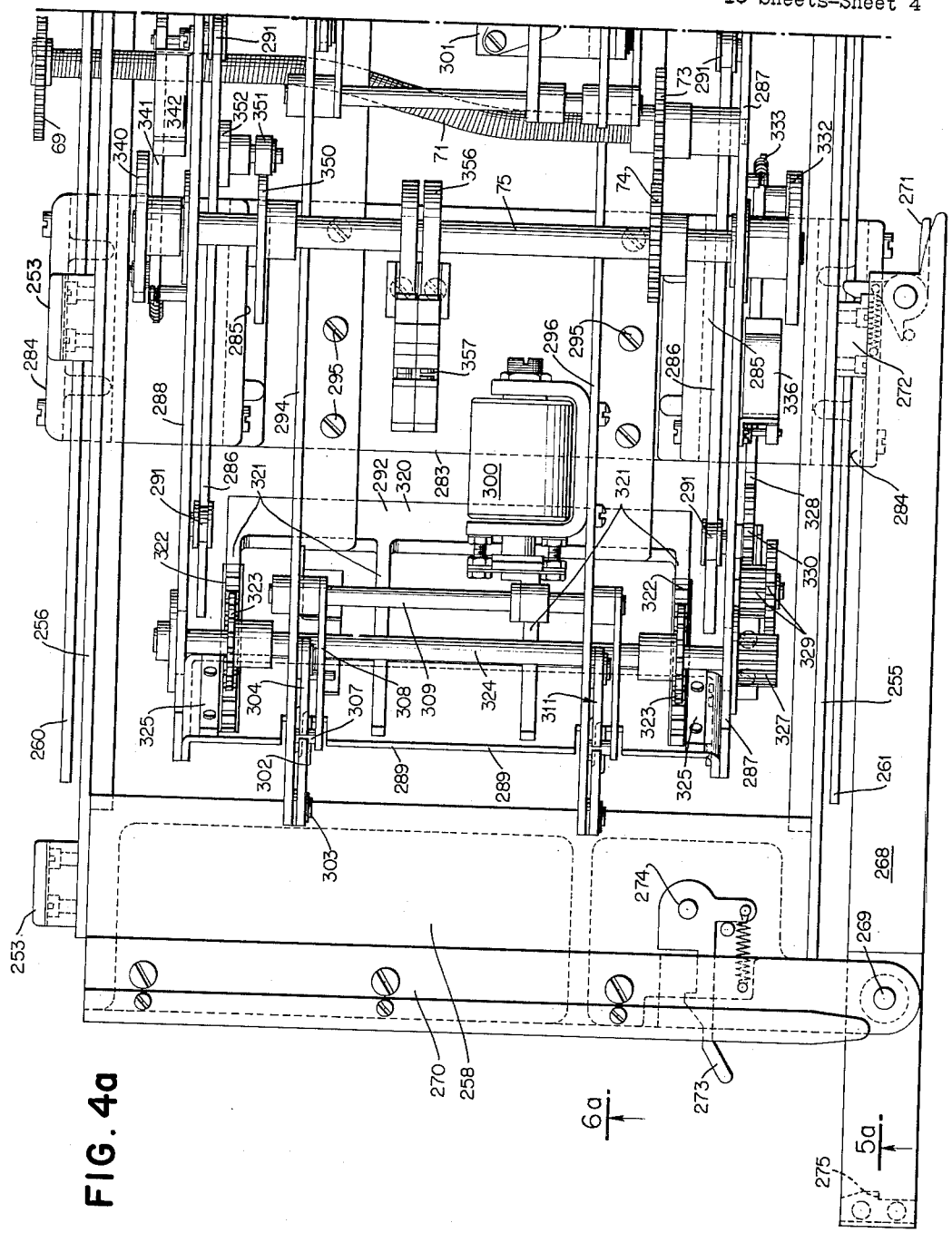

Sept. 12, 1961 S. BRAND 2,999,592
MANUALLY CONTROLLED RECORD SORTING MACHINE
Filed Feb. 9, 1955 18 Sheets-Sheet 5

Sept. 12, 1961　　　　　　S. BRAND　　　　　2,999,592
MANUALLY CONTROLLED RECORD SORTING MACHINE
Filed Feb. 9, 1955　　　　　　　　　　　18 Sheets-Sheet 6
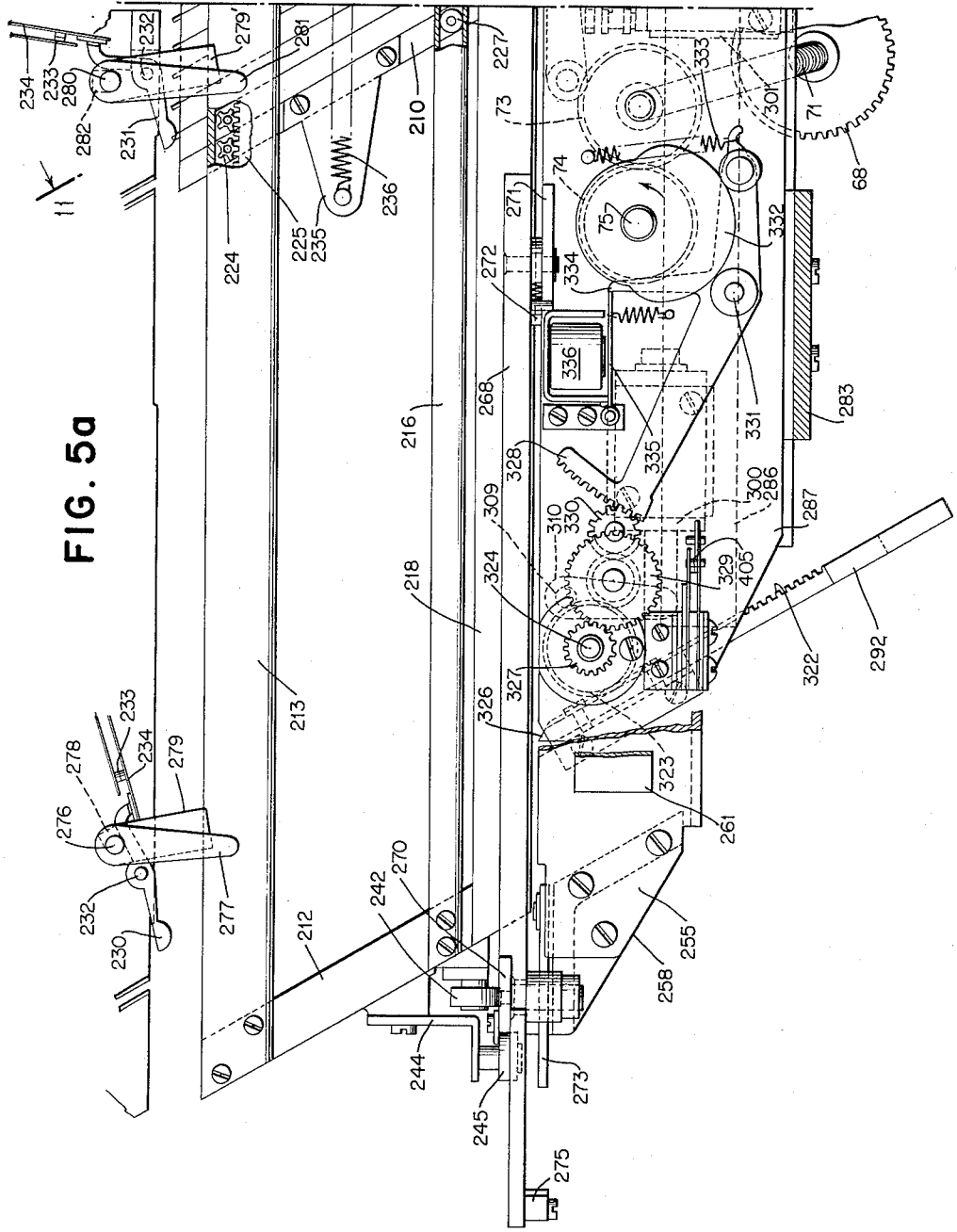
INVENTOR
SAMUEL BRAND
BY
J. W. Lowritzer
ATTORNEY

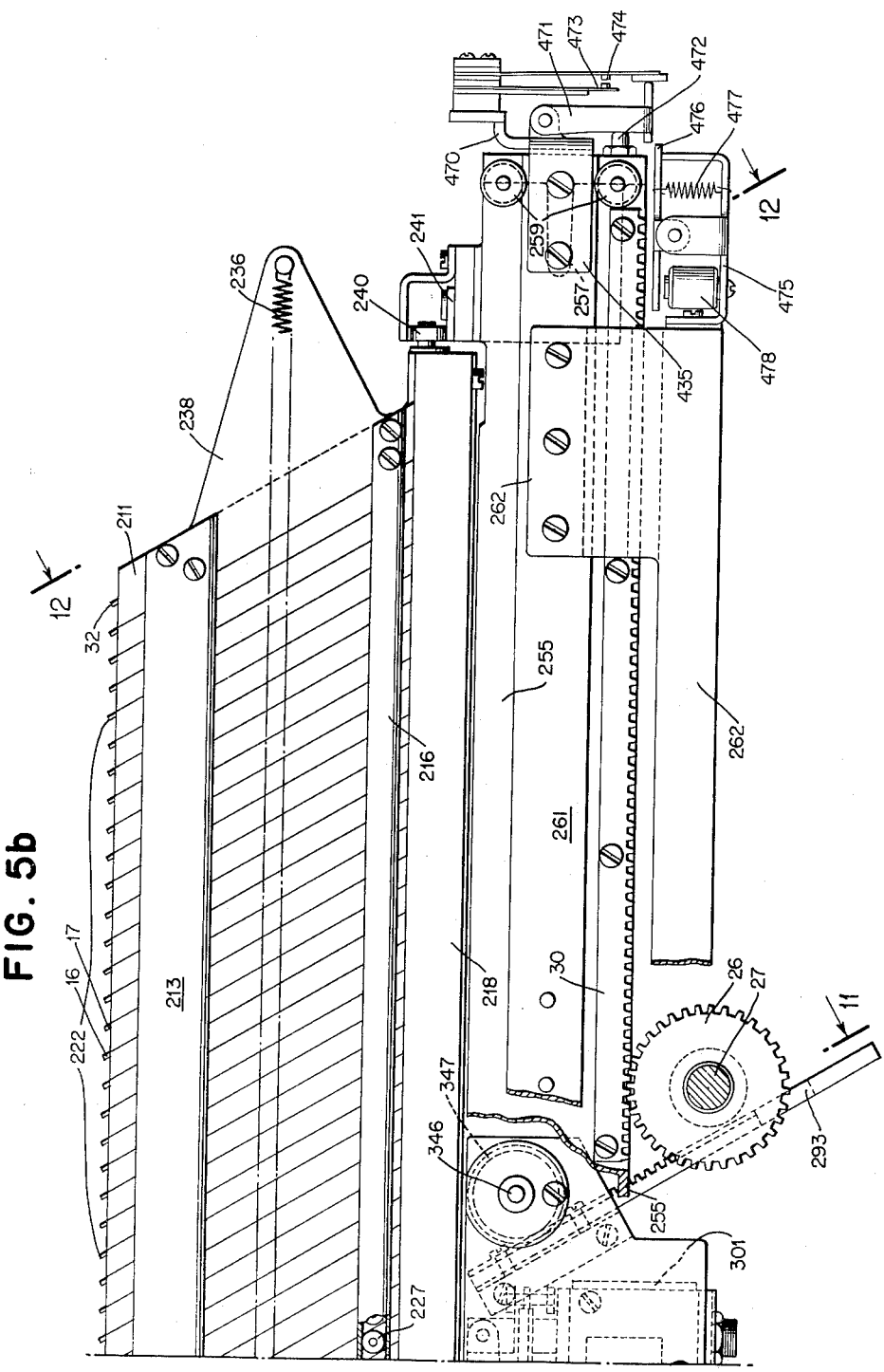

INVENTOR
SAMUEL BRAND

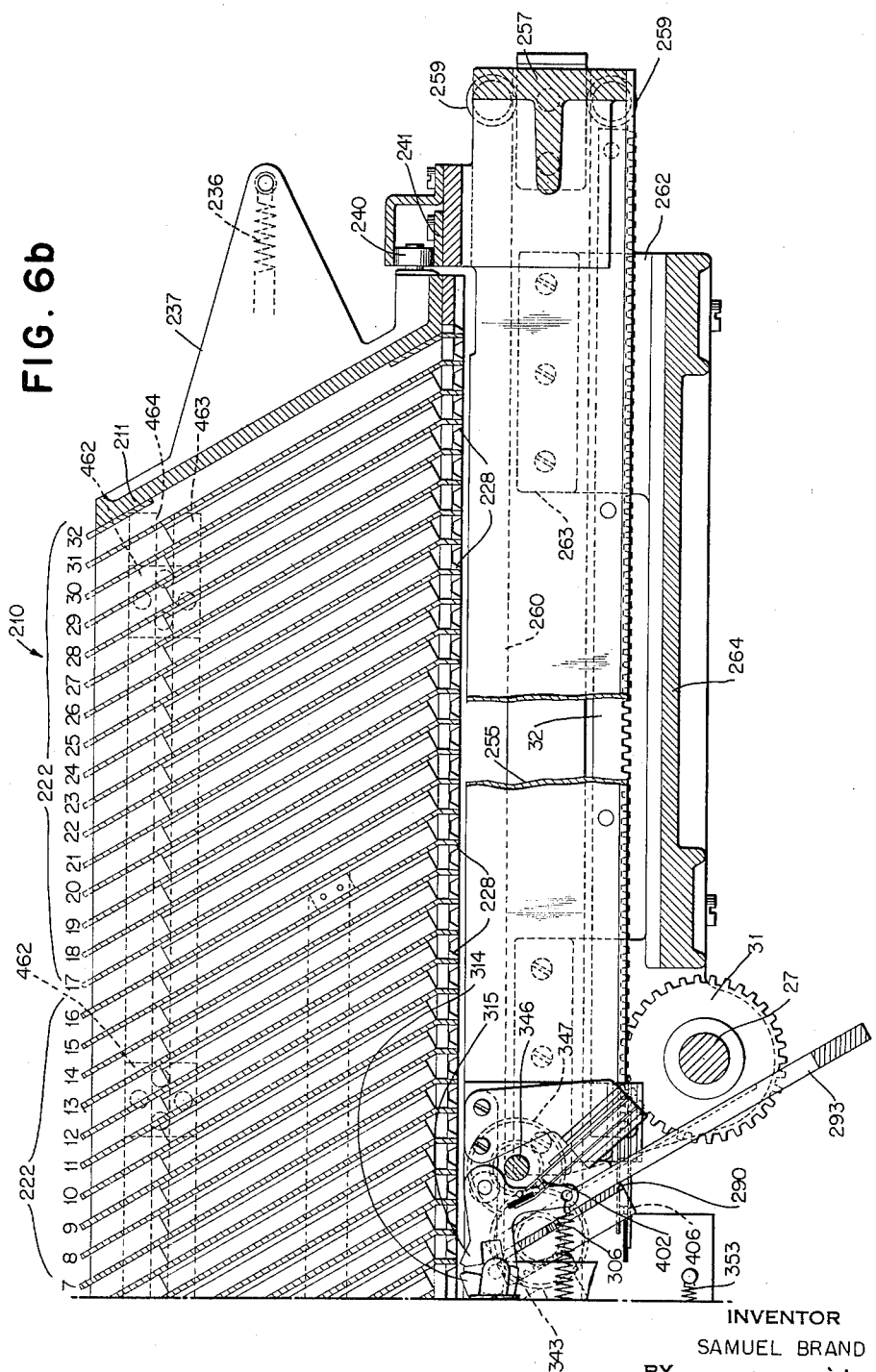

Sept. 12, 1961 S. BRAND 2,999,592
MANUALLY CONTROLLED RECORD SORTING MACHINE
Filed Feb. 9, 1955 18 Sheets-Sheet 11

INVENTOR
SAMUEL BRAND
BY
F. W. Lownitzer
ATTORNEY

Sept. 12, 1961 S. BRAND 2,999,592
MANUALLY CONTROLLED RECORD SORTING MACHINE
Filed Feb. 9, 1955 18 Sheets-Sheet 12

INVENTOR
SAMUEL BRAND
BY
*J. W. Lomritzer*
ATTORNEY

Sept. 12, 1961  S. BRAND  2,999,592
MANUALLY CONTROLLED RECORD SORTING MACHINE
Filed Feb. 9, 1955  18 Sheets-Sheet 14

INVENTOR
SAMUEL BRAND
BY
F. W. Lorenitzky
ATTORNEY

Sept. 12, 1961 S. BRAND 2,999,592
MANUALLY CONTROLLED RECORD SORTING MACHINE
Filed Feb. 9, 1955 18 Sheets-Sheet 15

INVENTOR
SAMUEL BRAND
BY
J. W. Rommitzer
ATTORNEY

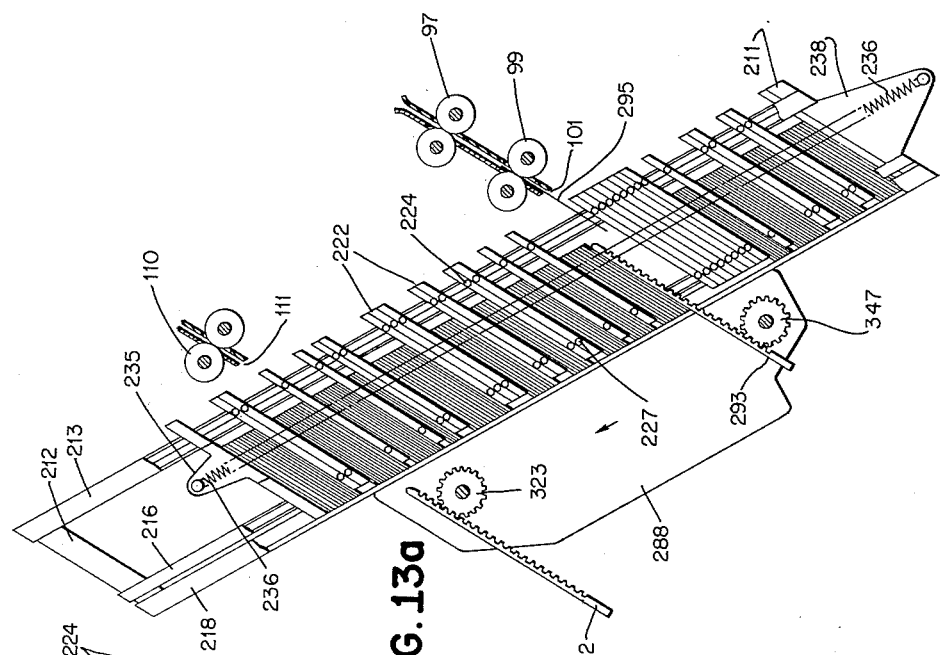
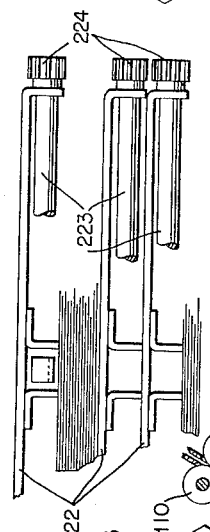
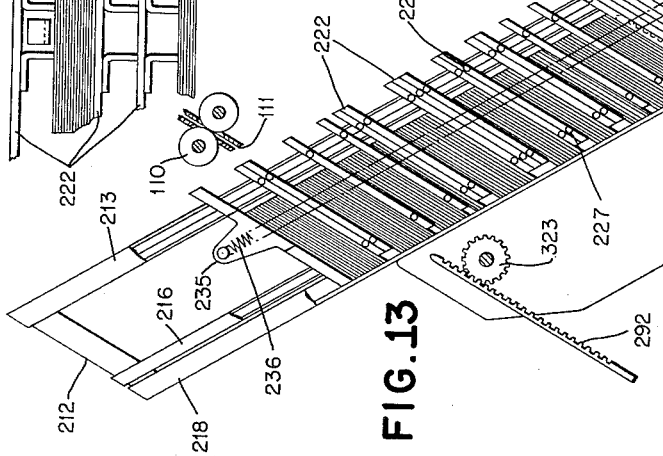

INVENTOR.
SAMUEL BRAND

United States Patent Office 2,999,592
Patented Sept. 12, 1961

2,999,592
MANUALLY CONTROLLED RECORD SORTING MACHINE
Samuel Brand, Binghamton, N.Y., assignor to International Business Machines Corporation, New York, N.Y., a corporation of New York
Filed Feb. 9, 1955, Ser. No. 487,089
19 Claims. (Cl. 209—122)

This invention pertains to means for selectively filing or sorting classified papers, such as checks, as well as sales slips, coupons, etc. and has for its objects to provide a simple and efficient device for this purpose by means of which such papers may be rapidly and accurately filed according to their classification.

In some of the prior arrangement the sorting pockets or compartments were provided by fixed partitions in a rotatable drum, the result being that with this construction each sorting pocket was of a predetermined size. Since the number of checks or papers in each classification usually varied, some sorting compartments would probably receive only a few checks and other compartments a greater number with the result that when a compartment was completely filled before the others the sorting had to be stopped and the pocket emptied. It is to overcome this frequent interruption that the present arrangement has been devised and the invention, therefore, relates to a construction of a sorting machine in which partition plates are individually movable therein, said partition plates demarcating the individual expandable compartments which plates are forcibly separated to provide a check receiving space.

A further object is to devise a selecting means for selecting the compartment to receive the papers, which is preferably in the form of a keyboard. The invention is, however, not limited to this form of selecting means since other equivalent devices may be provided to accomplish the same purpose.

A still further object is to provide selecting means which effects a differential position of a slidable sorting tray having expandable sorting compartments and positions it with respect to a chute in which the check is to be inserted and fed by rollers to the selected check receiving compartment.

Another object, particularly in connection with the means to form the check receiving space, is to provide a separator or movable fingers normally located beneath the check sorting tray and which are projected upwardly so as to effect a separation between adjacent partition plates to provide a check receiving space.

A still further object of the invention, particularly in connection with the formation of the check receiving space, is to cause a lateral shift of the upwardly raised separator, thereby forciby separating the adjacent partition plates and to thus provide a larger space which receives the oncoming check.

A still further object related to the construction of the sorting tray is to devise a sorting tray wherein the partition plates and papers sorted therebetween are under compression, effected by resilient means, such as a normally tensioned spring.

Another object of the invention which insures a proper formation of the desired check receiving space is to provide aligning means which holds one of the partition plates adjacent the separator so that partition plates to one side of the separator are held downwardly while the shifting of the adjacent partition plate by the separator may be effected to form the check receiving space.

A further object of the invention which relates to provision of a more efficient paper sorting system is to divide the compartments into two series and provide two exits, each of which feeds the oncoming check into the space provided in the selected series. The provision of two exits obviously diminishes the extent of movement of the sorting tray and shortens the time utilized for selection of compartments. Therefore, the maximum movement of the sorting tray required would be the distance between the end compartments of each series which is much smaller than that required if only one series of compartments was provided, since the distance between end compartments of one series is much greater.

A still further object of the invention, especially in connection with the division of the sorting compartments in two series, is to provide two separators and two sets of aligning means so that in accordance with the compartment selected in a series the related separator and aligning means will be selected for operation.

The present invention may be summarized as having for its object to provide a keyboard with differential positioning means under control of the keyboard for bringing a selected compartment in operative relationship of the feeding rollers which provide for feeding a check inserted in the chute in the selected compartment; to provide a sorting tray having expandable pockets defined by individually movable partition plates; to provide separators in the nature of projectable fingers which effect a separation between adjacent partition plates; to provide means to effect a lateral shift of said fingers to effect such a separation between partition plates so that the check may be fed therein without interference; to provide means for holding one of the partition plates while the adjacent one is being shifted; to provide signal means to indicate when the maximum number of papers or checks has been sorted in a selected compartment in either group; to provide a signal when either group has been filled to capacity; and to provide an interlock to prevent depression of the motor release bar until the carriage has terminated its movement to select a compartment. Each of the above constitutes a distinctive and separate feature of the invention and may be used singly or in combination in other forms of sorting machines to secure the same results. Therefore, the listing of each feature should not be regarded as restrictive in the sense that it must be included in the machine.

Other objects of the invention will be pointed out in the following description and claims and illustrated in the accompanying drawings, which disclose, by way of example, the principle of the invention and the best mode, which has been contemplated, of applying that principle.

Figure 4B:
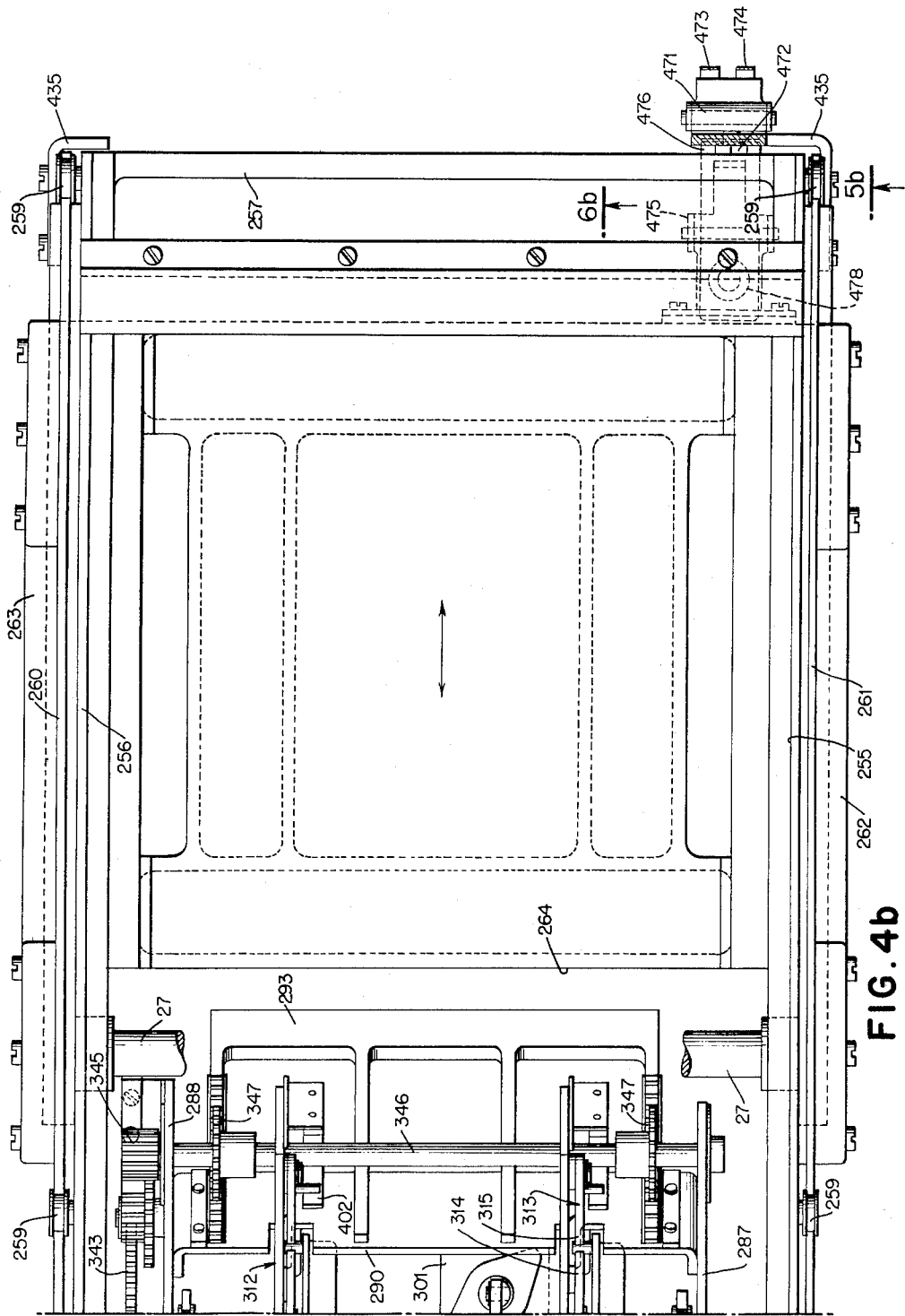

FIGS. 4a and 4b when assembled in this order constitute a plan view of the mechanism underneath the check sorting tray.

FIGS. 5a and 5b when assembled in this order constitute a side elevational view taken on the line 5a—5b of FIGS. 4a and 4b and show the relation of the check sorting tray with regard to the movable carriage which positions said tray.

Figure 6A:
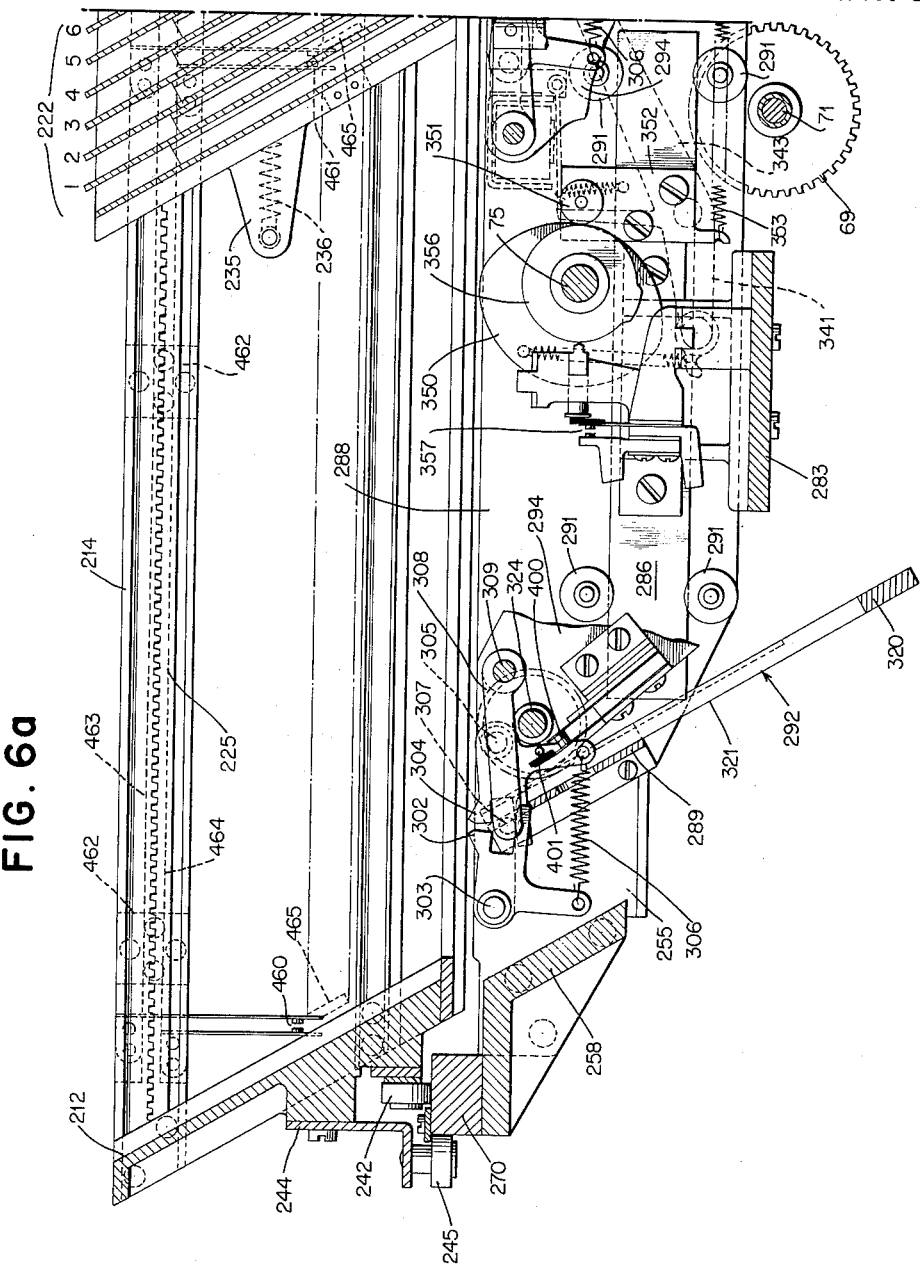

FIGS. 6a and 6b when assembled in the order designated show a longitudinal sectional view taken on the line 6a—6b of FIGS. 4a—4b.

Figure 7:
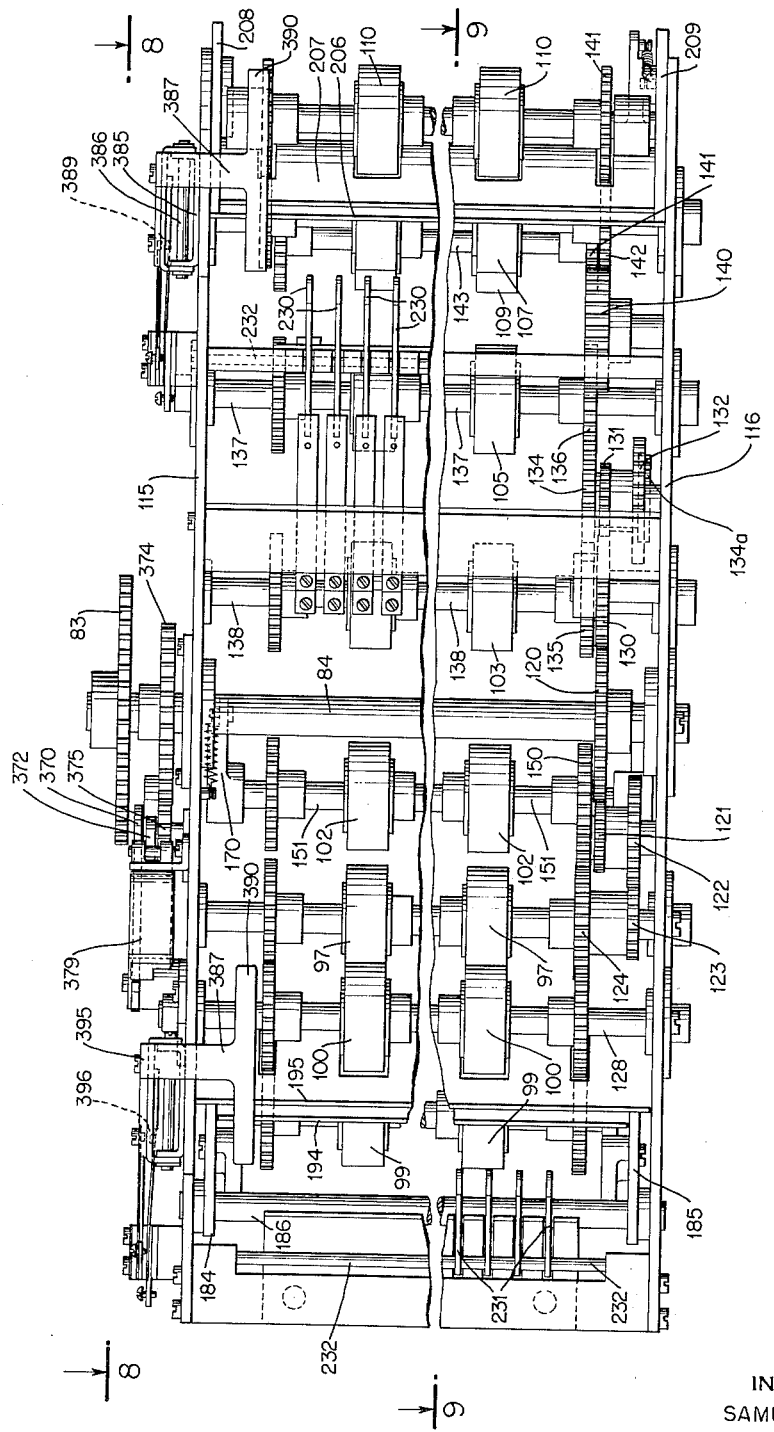
Figure 9:
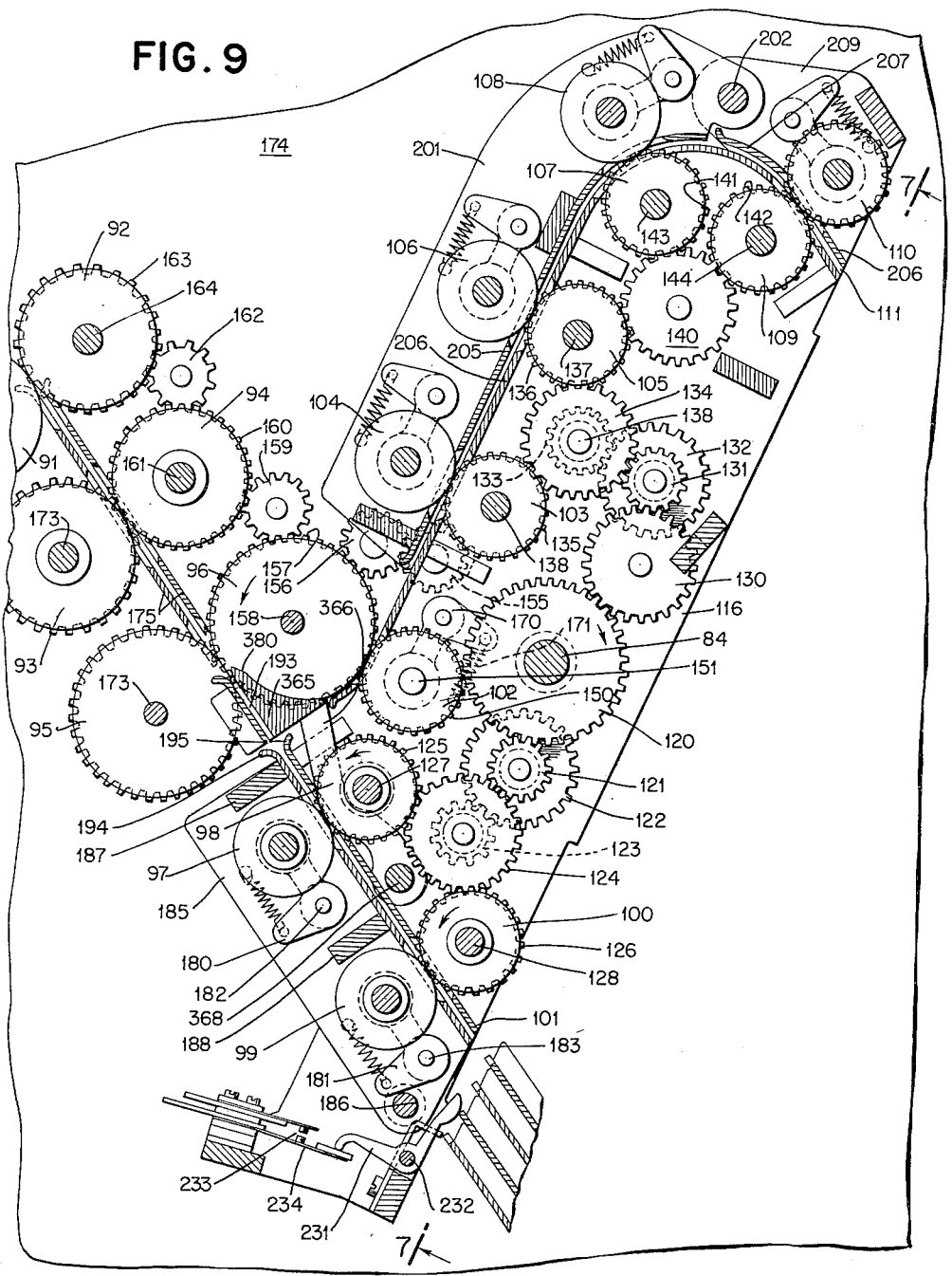

FIG. 7 is an inverted plan view taken on the line 7—7 of FIG. 9.

Figure 8:
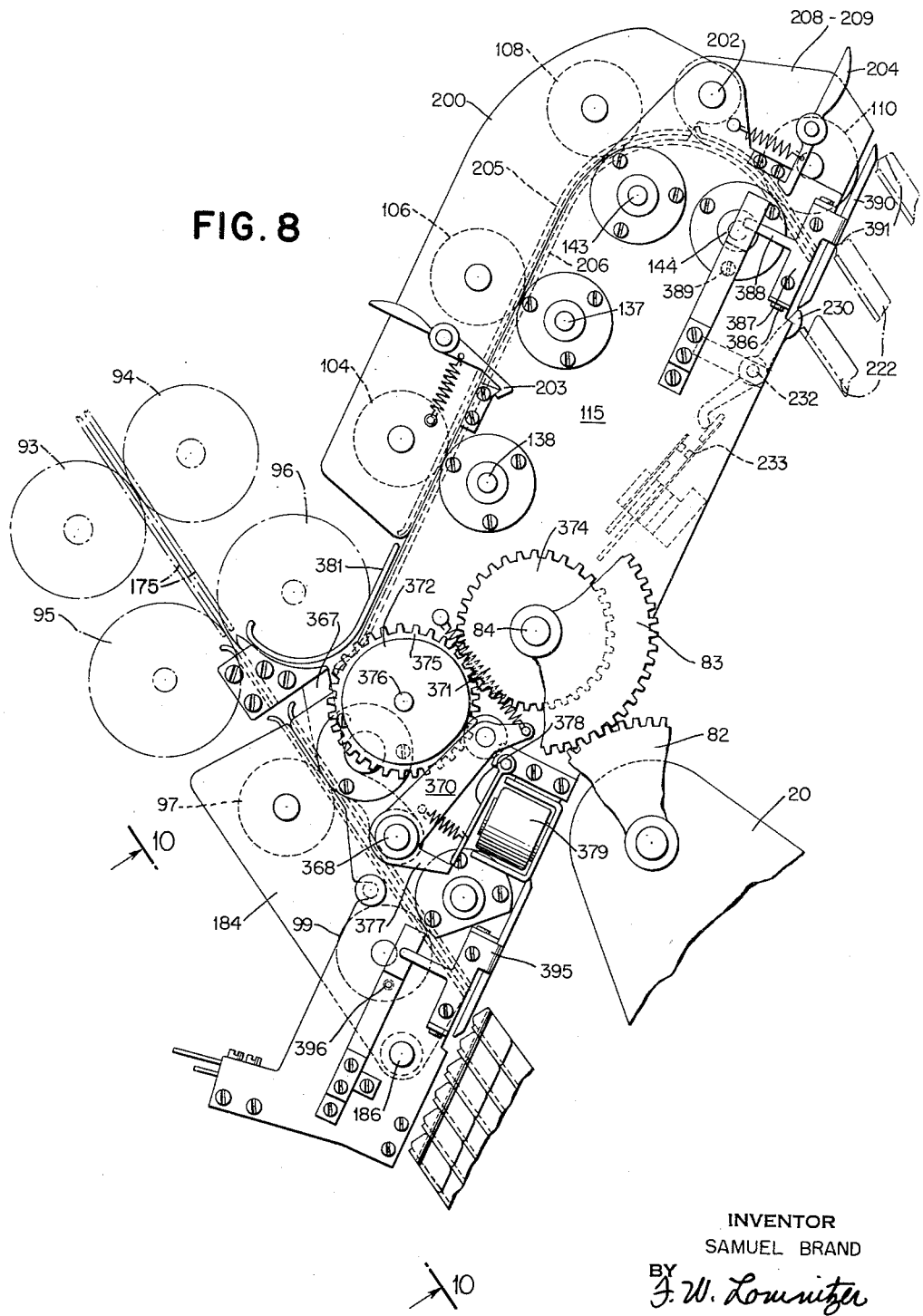

FIG. 8 is a side elevational view taken on the line 8—8 of FIG. 7.

FIG. 9 is a sectional view taken on the line 9—9 of FIG. 7.

Figure 10:
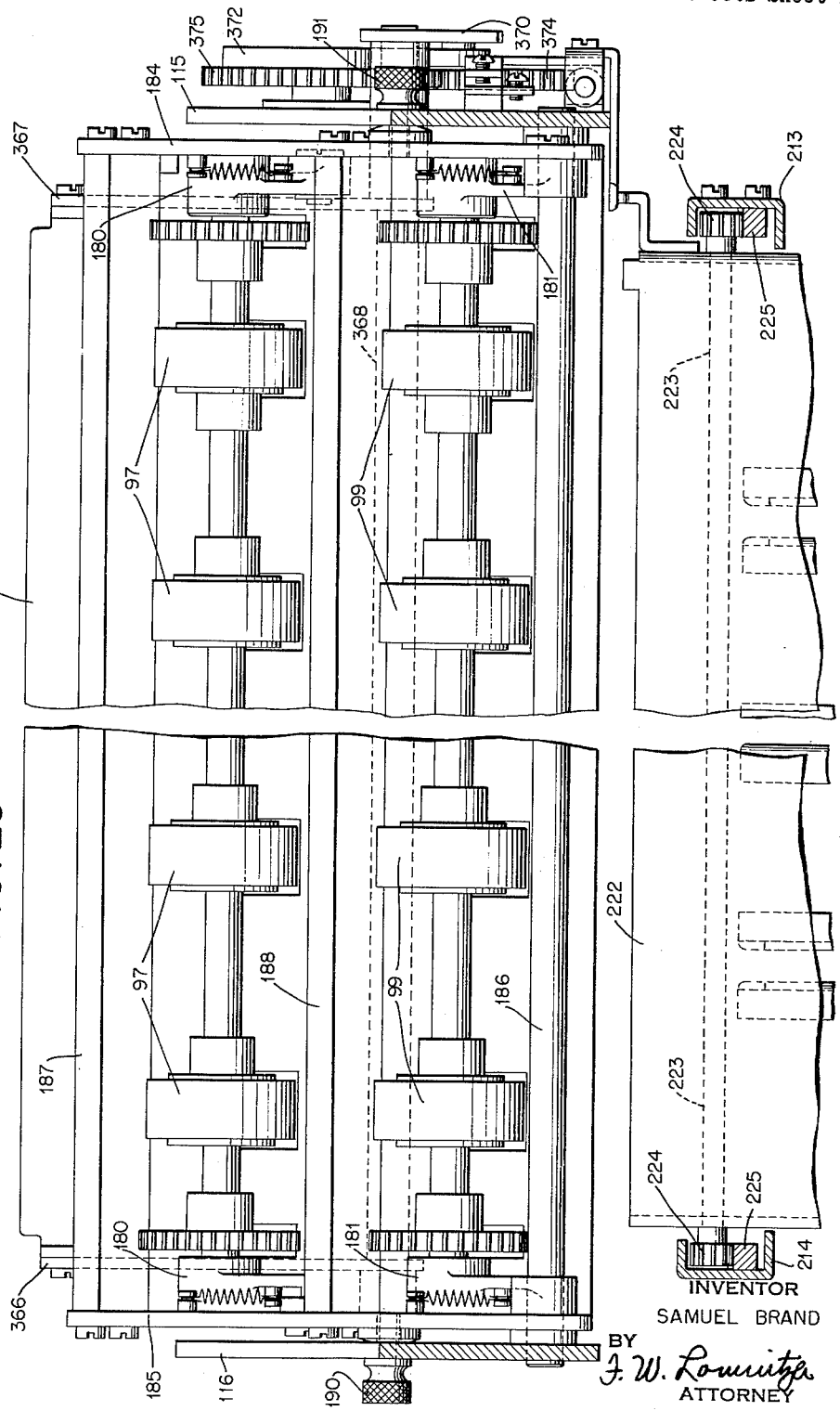

FIG. 10 is a sectional view taken on the line 10—10 of FIG. 8 but on a much enlarged scale.

Figure 11:
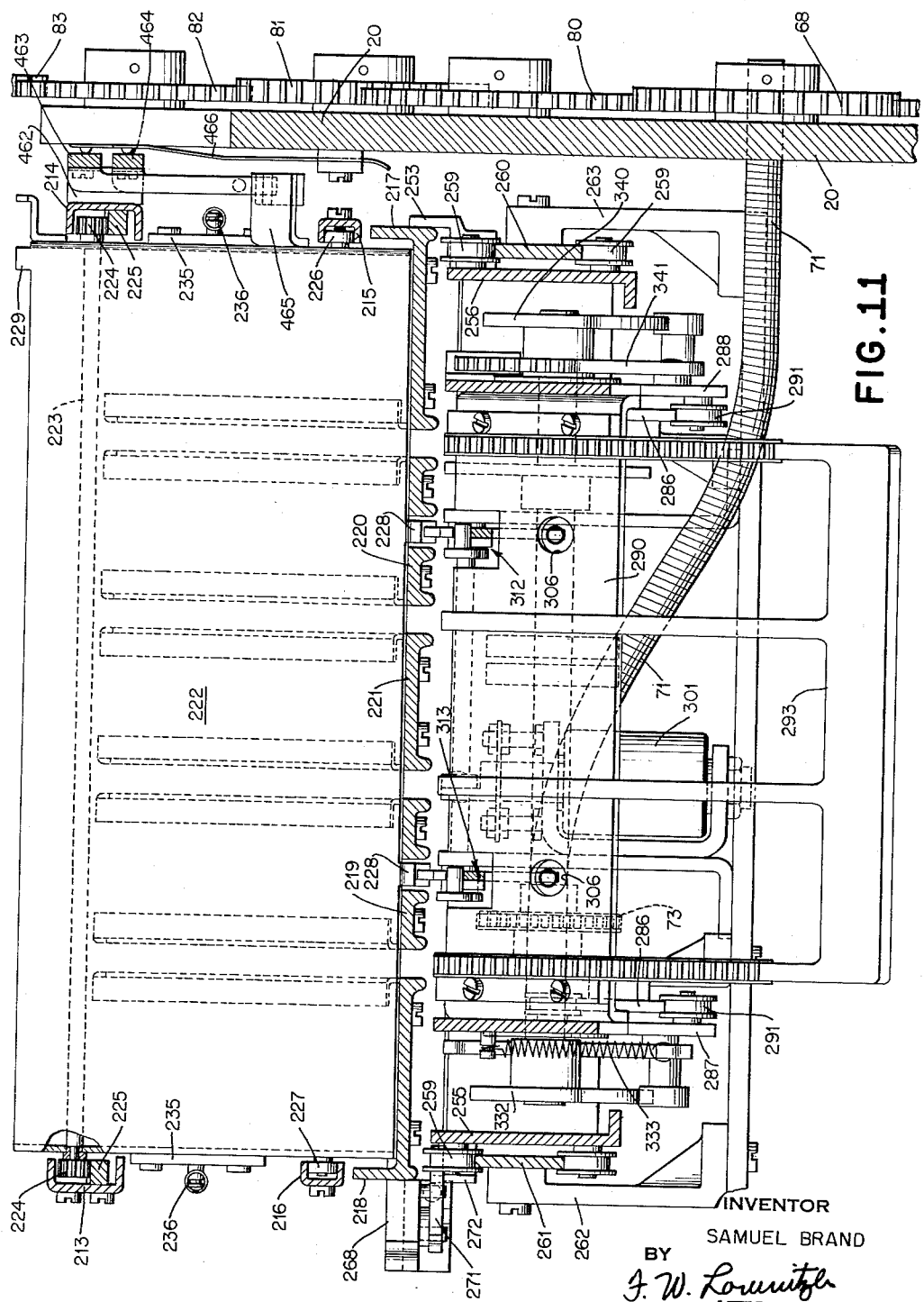

FIG. 11 is a transverse sectional view taken on the line 11—11 of FIGS. 5a and 5b when assembled.

Figure 12:
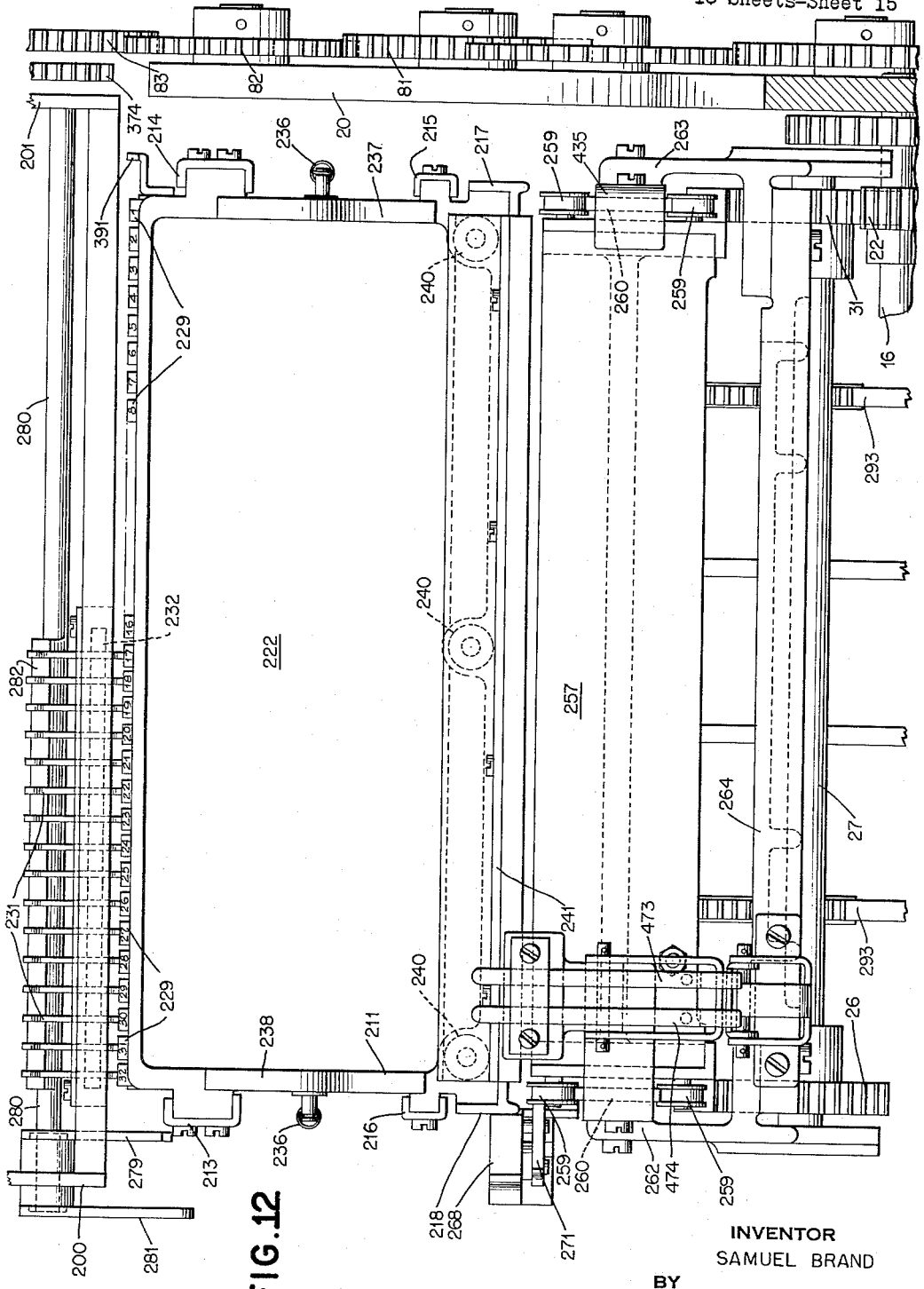

FIG. 12 is a transverse sectional view taken on the line 12—12 of FIG. 5b.

FIGS. 13 and 13a are separate diagrammatic views showing the manner in which one of the separators enters a check sorting tray as is shown in FIG. 13, and is moved upwardly as shown in FIG. 13a to provide a check receiving space.

FIG. 14 is a detail view showing the construction of the partition plates forming the check receiving compartments.

Figure 15A:
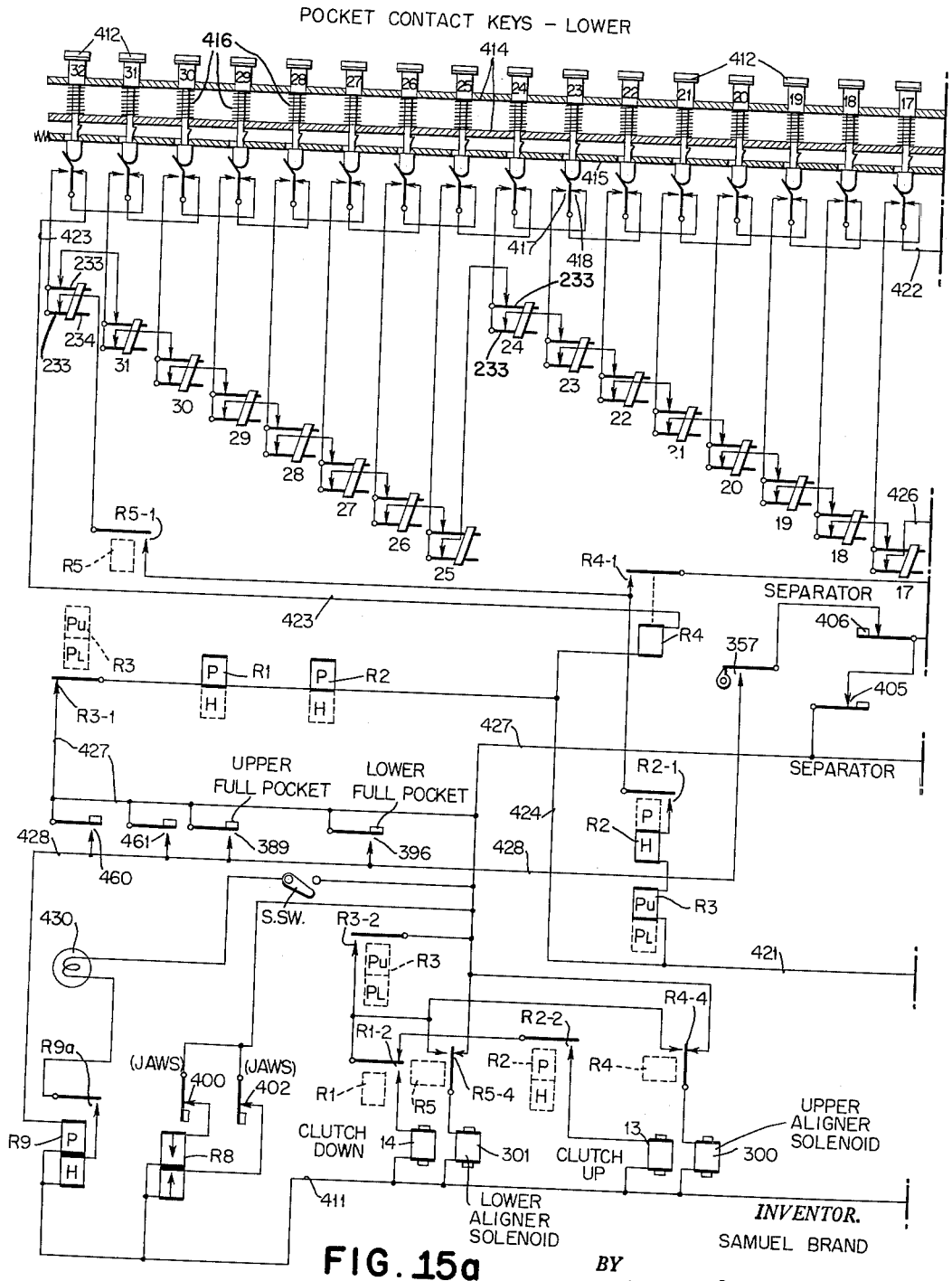
Figure 15B:
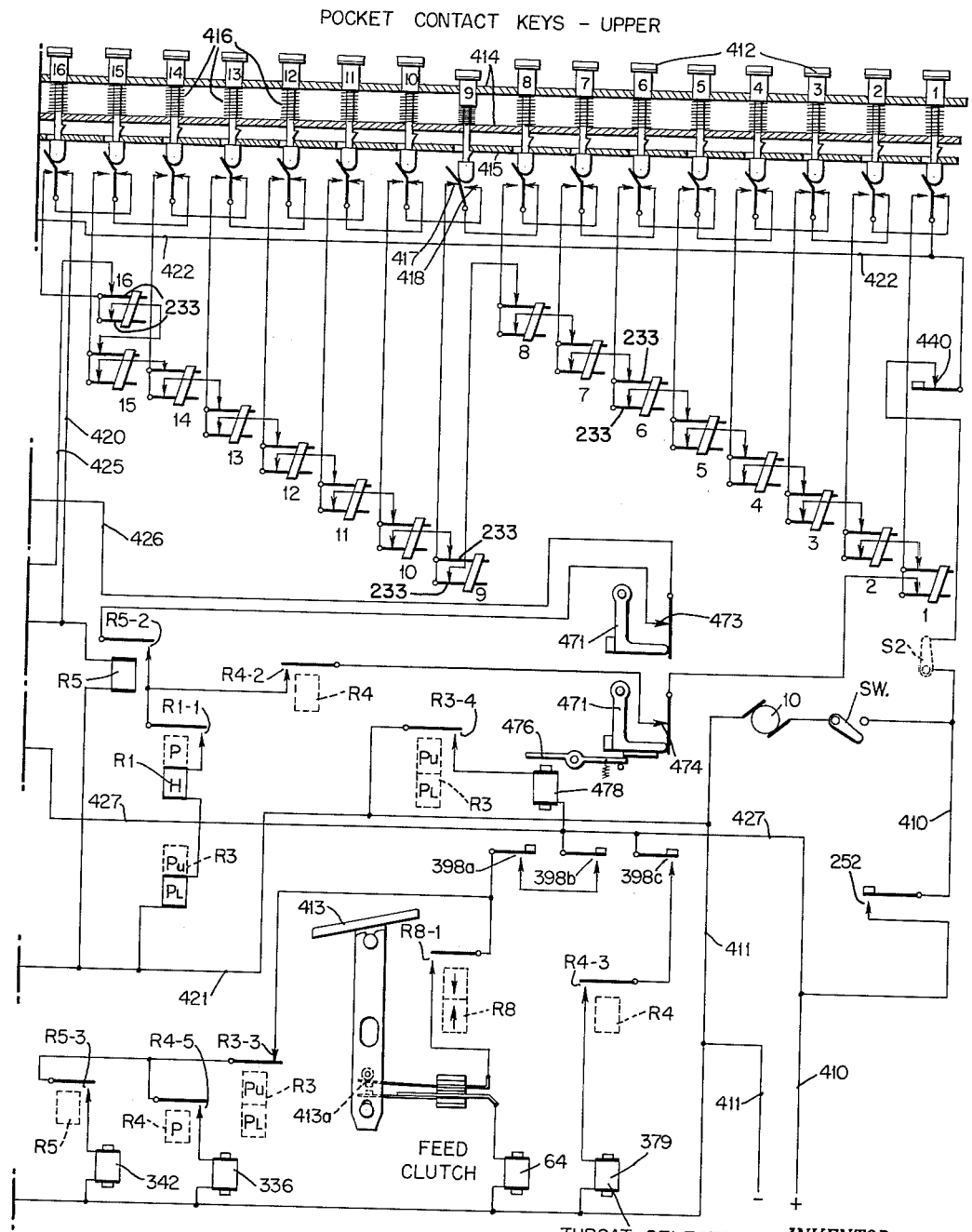

FIGS. 15a and 15b constitute a wiring diagram of the machine.

Main power drive

The power for operating certain parts of the machine is derived from a constantly running motor 10 (FIGS. 1, 2 and 3) which drives by means of a pulley and belt 11 (FIG. 2) at its left end a clutch drive shaft 12, said drive shaft being journalled in side frames 20. Shaft 12 is a clutch drive shaft and by means of an electromagnetic clutch 13 of a conventional design in which one element is driven by shaft 12 and the other element is coupled thereto when a winding is energized, a gear 14' attached to said later element but loose on said shaft 12 is rotated. Gear 14' meshes with a gear 15 secured to a drive shaft 16, which shaft is also journalled in the side frames 20. Therefore, whenever the clutch 13 is engaged shaft 16 will be rotated in a direction opposite that of shaft 12 and the armature drive shaft of the motor 10.

There is also a second electromagnetic clutch 14 which, when engaged, is adapted to clutch shaft 12 with a gear 17 (FIG. 3), said gear meshing with an idler gear 18 which in turn meshes with a gear 19 also secured to the shaft 16. Therefore, it will be evident that when the clutch 14 is engaged the shaft 12 will drive shaft 16 in the same direction as shaft 12 and the armature shaft of motor 10, which rotation is opposite to that given to shaft 16 when it is driven as a result of the engagement of clutch 13.

Secured to shaft 16 is a pinion 22 (FIG. 3) meshing with a gear 23 on a stud shaft 24 and attached to gear 23 is a pinion 25 meshing with a gear 26 on a shaft 27. Gear 26 is in mesh with a rack 30 (FIG. 3) while a gear 31 (FIG. 2) also secured to shaft 27 is in mesh with a respective rack 32. Therefore, with the interconnected gearing between shaft 16 and shaft 27, it will be observed that in accordance with the selective engagement of clutches 13 and 14 shaft 27 is rotated in one direction or another. With the counterclockwise rotation of motor 10 as viewed in FIG. 3 engagement of clutch 13 will cause a counterclockwise rotation of shaft 27 as viewed in FIG. 1 so as to move racks 30 and 32 and a sorting tray 210 upwardly. The engagement of clutch 14 will rotate shaft 27 oppositely and therefore move racks 30 and 32 and the sorting tray downwardly. These racks are part of a framework which carries a sorting tray and therefore, according to the particular clutch 13 and 14 which is engaged, the sorting tray is moved upwardly or downwardly for a purpose to be subsequently explained.

Figure 2:
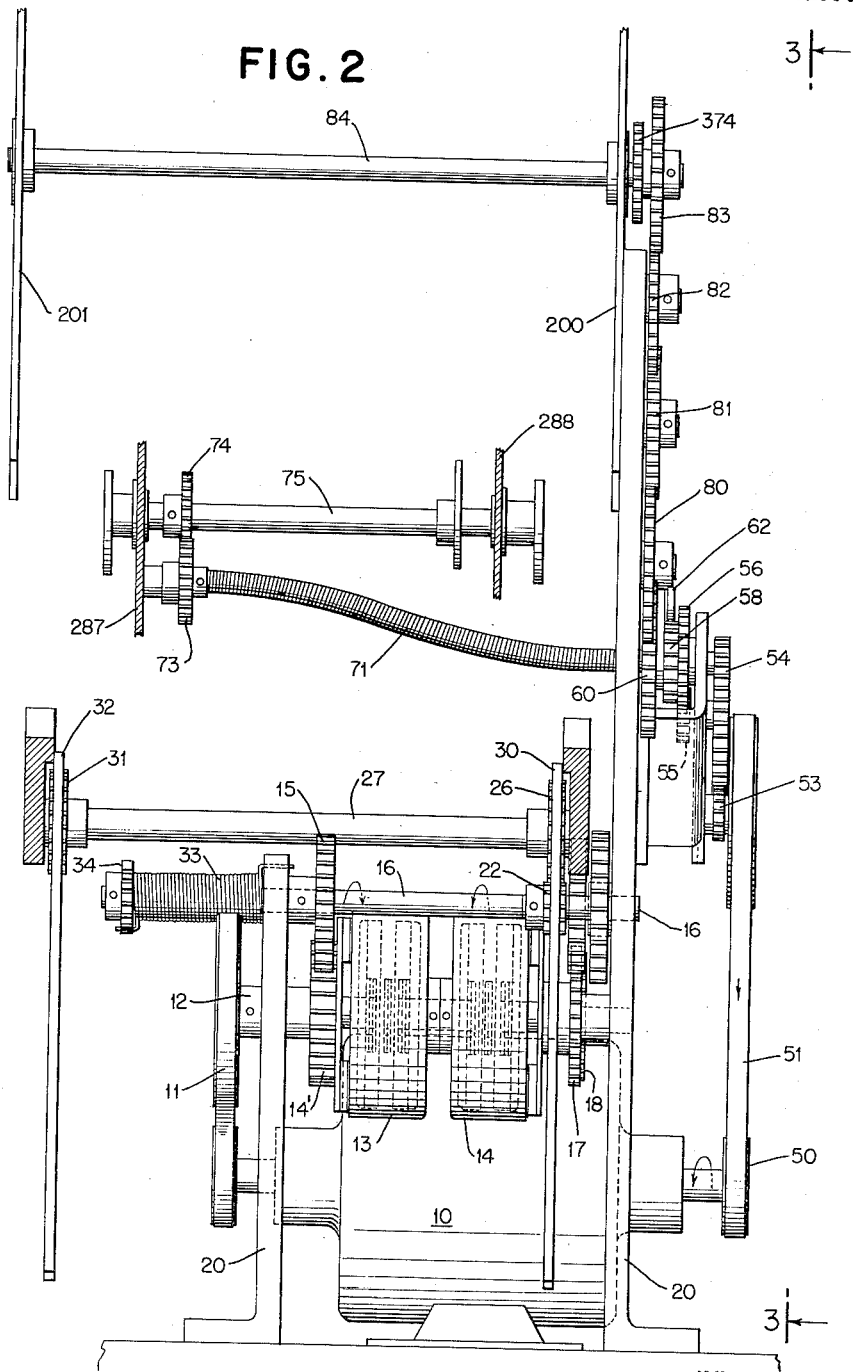
FIG. 2 is a front elevational view showing the electromagnetic clutch driving and reversing mechanism.

A counter-balancing spring is provided to offset the weight of the sorting tray 210 and its carriage. As shown in FIG. 2 this preferably consists of a torsion spring 33 mounted on the left-hand end of reversing shaft 16. One end of the spring is anchored in the frame 20 and the other end is held in one of the notches in a collar 34 fast to the end of shaft 16. The different notches permit adjustment of the amount of spring tension.

Figure 3:
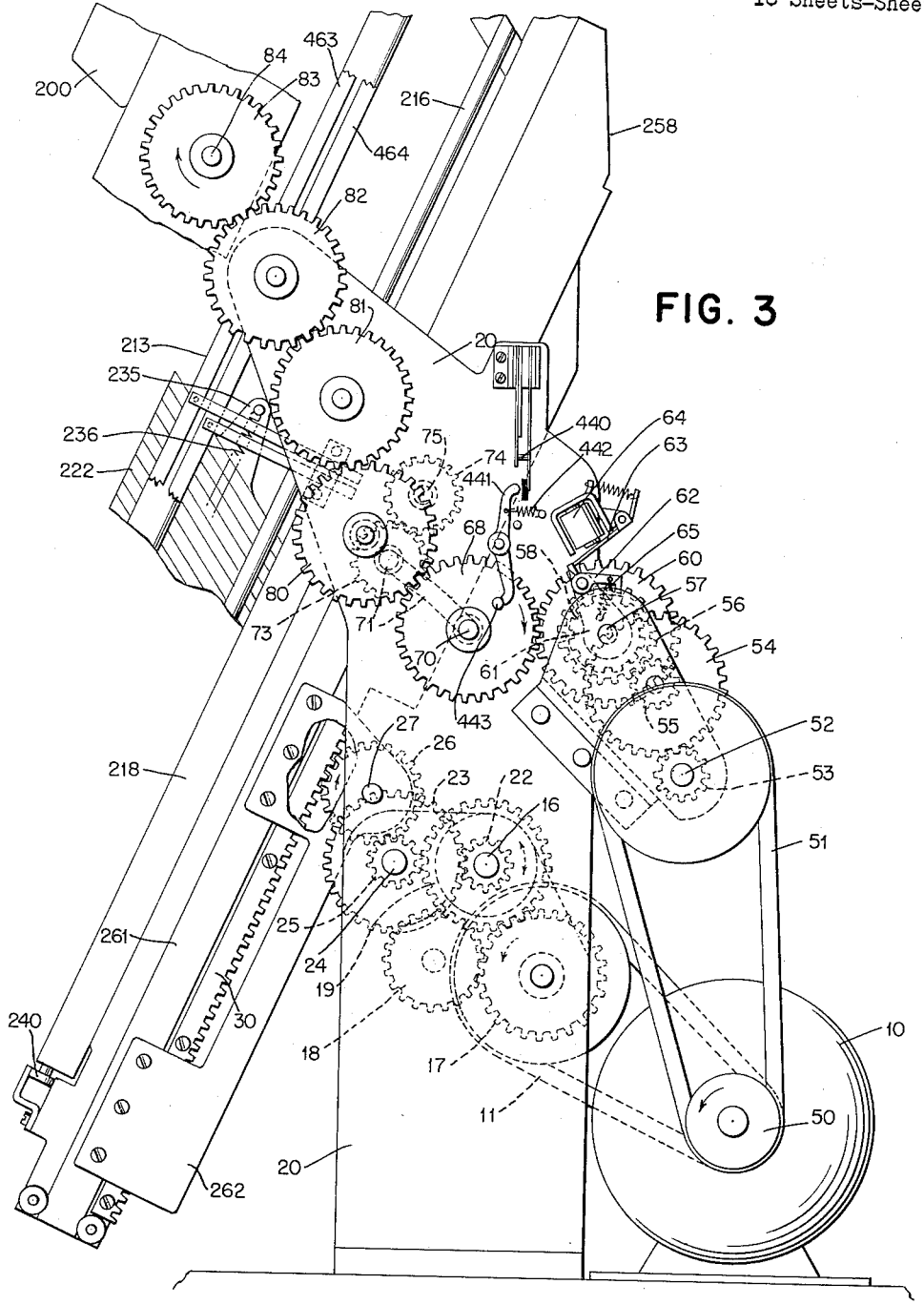
FIG. 3 is a side elevational view taken on the line 3—3 of FIG. 2.

The spring 33 is biased against the downward movement of the check tray and its traveling carriage. As seen in FIG. 3 this would be counter to the counterclockwise rotation of shaft 16 which means that the downward movement of the carriage would wind up the spring and the upward movement would unwind it.

The spring tension would be adjusted to overcome most, but not all, of the weight of the empty tray and its carriage. When the carriage is freed from the driving clutches it will tend to move downwardly by gravity to a lower position but not violently, due to the tension of the spring 33. When the tray is full of checks, it would, of course move downwardly with more force than when emptied. As will be evident later on, the downward movement of the carriage and tray comes into play when no keys are depressed, when changing from one key group to the other, and when removing the tray.

The armature shaft of the motor 10 has secured thereto a pulley 50 (FIGS. 2 and 3) which through a belt 51 rotates a pulley secured to a shaft 52, which shaft carries a pinion 53. From shaft 52 there is a gear and drive train which includes the pinion 53, gear 54, pinion 55, and a gear 56 loose on a clutch drive shaft 57. Secured to the gear 56 is a ratchet wheel 58 and through the aforementioned gear drive ratchet wheel 58 constantly rotates. There is a usual form of one-revolution clutch cooperating with ratchet wheel 58 so as to drive a gear 60 one complete revolution. Secured to the gear 60 is an arm 61 (FIG. 3) carrying a spring-urged clutch pawl 62 which is in the plane of the ratchet wheel 58 but normally held out of engagement therewith by means of a latching armature 63 adapted to be attracted by clutch control magnet 64 when the latter is energized. When such clutch control magnet is energized its armature 63 is attracted upwardly, disengaging it from a tail of the pawl 62 which thereupon is urged by a spring 65 to engage a tooth of the ratchet wheel 58. With such clutch engagement the arm 61 which carries such clutch pawl 62 is rotated one revolution until the tail of the clutch pawl 62 is now engaged by the interim returned armature 63, thereby disengaging the pawl 62 from the ratchet wheel 58 after a complete revolution of the arm 61 and gear 60.

Gear 60 meshes with a gear 68 (FIGS. 1 and 3) fast on a shaft 70. Shaft 70 (FIGS. 1 and 3) has a flexible shaft 71 (see FIG. 2) fastened to it and one end of the flexible shaft 71 is journalled in a frame piece 287 and said shaft 71 has attached to it a gear 73 which is in mesh with a gear 74 secured to a drive shaft 75.

Gear 68 meshes with an idler gear 80 (FIGS. 2 and 3) and through idler gears 81 and 82 drives a gear 83 which is fastened to a shaft 84 of the check feed unit.

Check feeding unit

The details of the check feeding unit are shown in FIGS. 7, 8, 9 and 10 and said unit is driven by shaft 84 when the latter is rotated as a result of the engagement of the one-revolution clutch controlled by clutch control magnet 64 (FIG. 3).

In general, the check feed unit is adapted to feed a check manually inserted in a chute 90 (FIG. 1) downwardly by means of sets of feeding rollers 91—92, 93—94, 95—96 (FIG. 9), and when the check emerges from the set of feeding rollers 95—96 it may be fed selectively in two directions. It may continue downwardly, fed by the cooperating sets of feed rollers 97—98 and 99—100, to an exit 101, or when the machine is so conditioned it may be directed to be fed upwardly in FIG. 1 by means of the sets of feed rollers 96—102, 103—104, 105—106, and then downwardly by feed rollers 107—108, 109—110 to an exit 111 (FIG. 9). The reason for feeding a check so that it emerges either from the exit 101 or 111 will be more apparent as the description proceeds.

Most parts of the check feeding units are carried by side frames 115 and 116 (see FIG. 7) in which shaft 84 is also journalled as well as some of the shafts bearing certain feed rollers. The gear drive from shaft 84 to the feed rollers will now be described.

As best shown in FIGS. 7 and 9 to shaft 84 there is secured near side frame 116 a gear 120 meshing with a pinion 121 which has a sleeve connection to a gear 122 which meshes with a pinion 123 to which a gear 124 is secured. The gear 124 is a common gear drive for gears 125 and 126 which are secured to the respective feed roller drive shafts 127 and 128 of feed rollers 98 and 100, respectively. Thus, through these gear drive connections just described feed rollers 98 and 100 are driven.

Gear 120 meshes with a gear 130 (FIGS. 7 and 9) which rotates a pinion 131 having a sleeve connection to a gear 132, the latter gear 132 meshing with a pinion 133 (see FIG. 9) secured to a gear 134. Gear 134 meshes with gears 135 and 136 secured to the respective feed roller drive shafts 138 and 137 of feed rollers 105 and 103, respectively. Gear 136 meshes with a gear 140 which in turn rotates gears 141 and 142 secured to the feed roller shafts 143 and 144 of feed rollers 107 and 109, respectively. The above gear drive constitutes the rotating means for the feeding rollers 103, 105, 107 and 109.

It should be noted that gear 120 also meshes with a gear 150 (FIG. 9) attached to the feed roller shaft 151 of the feed rollers 102. The gear 135 also meshes with an idler gear 155 (FIG. 9) which, through an idler gear 156, drives a gear 157 secured to the feed roller shaft 158 of the feed roller 96. From gear 157 there is an idler gear drive 159 to a gear 160 secured to the feed roller drive shaft 161 of the feed roller 94 and likewise gear 160 drives through an idler gear 162 a gear 163 secured to the feed roller shaft 164 of the feed roller 92. With the exception of the feed roller drive shaft 151 the feed roller drive shafts 127, 128, 137, 138, 143 and 144 are carried by the side frames 115 and 116. The feed roller drive shaft 151, like other feed rollers to be presently described, is carried by a pair of bell cranks 170 urged by springs 171 so that said feed roller 102 engages the cooperating feed rollers 96 without, however, breaking the gear drive between 120 and 150 when feed rollers 96 and 102 are feeding a check. It is pointed out that the supporting feed roller drive shafts 158, 161, and 164 as well as the feed roller drive shafts 173 for the feed rollers 91, 93 and 95 are journalled in suitable machine side frames, one of which designated 174 appears in FIG. 9. As the check is fed by the sets of rollers 91—92 and 93—94 they are guided by spaced guide plates 175 (see FIG. 9).

Cooperating with the feed rollers 98 and 100 are the related feed rollers 97 and 99 which are carried by respective spring-urged arms 180 and 181 (FIGS. 9 and 10), which arms are pivoted in rods 182 and 183 carried by a framework consisting of side frames 184 and 185 journalled upon a fixed rod 186. Said side frames are cross-connected by bars 187 and 188 to provide a rigid frame which is pivoted upon the rod 186 and therefore carries the spring-urged feeding rollers 97 and 99. Said frame is mounted between the side frames 115 and 116 and when the pivoted side frame 184, 185 is in the position shown in FIG. 8 it will be secured to the side frames 115 and 116 by means of knurled knobs 190 and 191 (FIG. 10). When the check is to be fed downwardly by the rollers 95 and 96 it will pass through a guide slot 193 (FIG. 9) and guide plates 194 and 195, the plate 194 being carried by the pivoted side frame just described, whereas the guide plate 195 is carried by the side frames 115 and 116. In the case of a check jamming in-between the guide plates 194 and 195, the pivoted frames 184—185 may be rocked around the rod 186 and access may be had thereto for the purpose of taking out the check.

It is also desirable to have the rollers 104, 106 and 108 carried by a similar pivoted side frame and said frame consists of two side members 200 and 201 (FIGS. 8, 9) which are pivoted between the side frames 115 and 116 and by a rod 202 carried by side frames 115, 116. The pivoted frame may be rocked about the rod 202 so as to withdraw the rollers 104, 106 and 108 to enable access to a check which may be jammed between guide plates 205 and 106, guide plate 205 being carried by the pivoted frame 200—201 and the guide plate 206 by the side frames 115 and 116. There is also a third pivoted frame consisting of frame plates 208—209 which carries the spring-urged feed rollers 110, said frame 208—209 also being pivoted on the rod 202 so that the feed rollers 110 may be separated from the feed rollers 109 and access be given to the check which may be jammed between the guide plate 206 and a guide plate 207 which is carried by the pivoted frame 208, 209. When in normal operating position the frame 208—209 is latched in position by a pair of conventional spring-urged latches 204 to the side frames 115—116.

*Card tray*

The card tray or carrier which is adapted to receive the checks or documents as they are sorted is shown in FIGS. 1, 3, 4a, 4b, 5a, 5b, 6a, 6b, 10, 11, 12, 13, 13a and 14.

Figure 1:
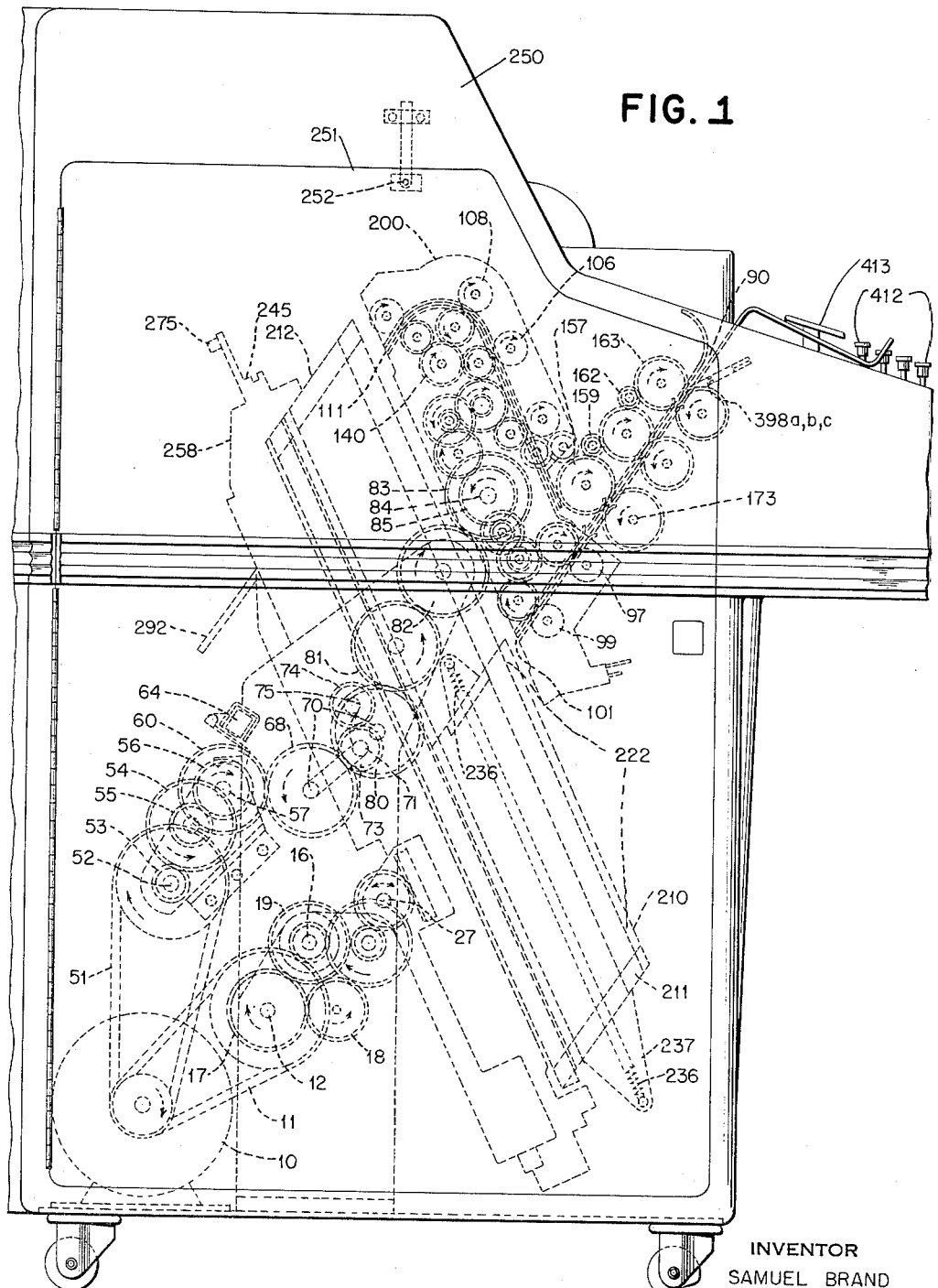
FIG. 1 is a side elevational view of the machine showing the general relation of the check sorting tray with respect to the check feeding mechanism and positioning mechanism for the sorting tray.

Referring to FIG. 1 reference character 210 designates generally the sorting tray which is movable upwardly or downwardly as shown in FIG. 1 and is so positioned as to receive checks emerging from either the exit 101 or 111. The sorting tray is provided with shiftable partitions to provide a check receiving space which is made variable in accordance with the number of checks sorted therein. In general, this is accomplished by slidably mounting in the sorting tray a plurality of movable partitions, adjacent ones of which are separated to provide a check receiving space, so that as a number of checks of the same classification are sorted in the same compartment the space is automatically increased in proportion to the number of checks sorted therein.

The sorting tray comprises castings 212 and 211 which are the upper and lower ones in FIG. 1, or the right and left-hand ones in FIGS. 5a and 5b and 6a and 6b, respectively. These castings constitute the ends of the tray. Secured to the castings 211 and 212 at the upper part thereof is a pair of channel-shaped bars 213 (FIG. 5a) and 214 (FIG. 6a). See also FIG. 11. Secured to the lower part of the castings 211 is a pair of channel-shaped bars 215 and 216, as best shown in FIG. 11. These two pairs of channel-shaped bars 213—216 form the sides of the tray 210 and guides to enable partition plates 222 to slide. The bottom of the tray is formed by L-shaped tie rails 217 and 218 (see FIG. 11) also secured to the end castings 211 and 212. In addition the bottom of the tray is formed by pairs of tie bars 219 (FIG. 11), a second set of tie bars 220 and a central tie bar 221, all of which are secured to end castings 211 and 212. The sets of tie bars 219 and 220 are separated for a reason to be subsequently explained. Thus, the bottom of the tray is formed by a series of cross rails or tie bars upon which the checks may rest as they are fed into sorting compartments, provided by the separation of partition plates 222.

*Partition plates*

Each of the partition plates 222, as best shown in FIGS. 10, 11, 12, 13, 13a and 14, is in the form of a U-shaped plate to which is journalled at the upper end a shaft 223 carrying pinions 224 at each end adapted to roll over a rack bar 225 (FIG. 11) attached to and carried by the upper channel bars 213 and 214. A further guide (see FIG. 11) for each of the partition plates comprises rollers 226 and 227 carried at each end of the plate which roll in and are guided by the respective channel bars 215 and 216. Thus, the partition plates may move within the tray independently of each other and without any possibility of tilting. The above supporting means for the partition plates 222 holds them spaced above the bottom of the sorting tray constituted by the rails 217, 218 and bars 219, 220 and 221, so that they may move without frictional engagement with any of said rails.

For purposes to be subsequently explained, each of the partition plates 222 has welded thereon or attached by any suitable means a pair of angular aligning blocks 228 (see FIGS. 6b and 11). One series of angular blocks 228 is movable in a path between rails 219, as shown in FIG. 11, and another series in a path between the rails 220. At the top of each partition plate there is an integral contact operating tab 229, each of which is adapted to travel in a separate path and as best shown in FIG. 12 the thirty-two tabs 229 are adjacent but do not overlap. As the tray with its partition plates is moved each of the tabs 229 in one series is adapted to rock its respective contact operating arm or lever 230 (FIG. 5a), and tabs 229 in another series rock a related bell crank or lever 231 (FIGS. 5a and 9).

The arms 230 and bell cranks 231 are loosely pivoted upon a respective rod 232 carried by the side frames 115 and 116 of the check feeding unit. When an arm 230 or bell crank 231 is rocked by its tab 229 as the tray is moved up or down it opens two pairs of contacts 233 (FIG 5a), since free ends of arms 230 and bell cranks 231 are formed over to overlie the resilient blades 234 of two pairs of contacts 233.

There are 32 partition plates 222 designated by Nos. 1–32 in FIGS. 6a, 6b and 12. An upper casting located above the No. 1 partition plate 222 is of a special construction in that it carries a pair of extensions 235 (FIGS. 13, 13a) to which long springs 236 are anchored, the other ends of the respective springs being anchored in extensions 237 and 238 (FIG. 12) of the end casting 211. These normally tensioned springs 236 keep all of the partition plates 222 together as shown in FIGS. 5a, 5b, 6a, 6b and when adjacent partition plates 222 are separated to form a check receiving space the springs 236 are additionally tensioned and when the separating means for an adjacent space is disengaged said springs 236 act to compress all of the partition plates 222 together with the sorted checks therebetween. Thereby, a stack of checks is always under compression so that they may not fall out as the tray is moved upwardly and downwardly for check sorting purposes.

*Removal of tray out of machine*

It is understandable, of course, that eventually the check sorting tray would be filled with checks, at which time, as will be subsequently explained, a signal is given to the operator indicating a full tray condition. Provision is thereby made to enable the check tray to be moved outwardly from the machine in a facile manner. To this end the casting 211 carries three rollers 240 (FIGS. 5b, 6b and 12) rolling over a fixed track plate or rail 241 and the casting 212 carries similar rollers 242 (FIGS. 5a, 6a) rolling over a track 270. To further guide the tray in its sidewise movement out of the machine a bracket 244 (FIGS. 5a and 6a) secured to casting 212 carries additional rollers 245 rolling over another surface of the fixed track or rail 270. As best shown in FIG. 1 the cabinet 250 of the machine has a hinged door 251 which normally covers all of the mechanism described herein but which is swung by the operator so as to allow free withdrawal of the check sorting tray from the left side of the machine shown in FIG. 1.

Mounted below the check sorting tray are two carriages, one carrying the operating mechanism for separators which effect a separation of selected partition plates 222. The other, which will now be described, is a slidable carriage which carries the check sorting tray. This slidable carriage is a casting consisting of side plates 255 and 256 (see FIGS. 4a, 4b), said side plates having integral end plates 257 and 258. The side plates 255 and 256 carry a set of four rollers 259 which engage rails or tracks 260 and 261 which are carried by the framework of the machine and are, therefore, fixed to enable the carriage and check sorting tray to be moved to the desired position.

To this end the rails 260 and 261 are supported by plates 263 (FIGS. 4b and 5b) and 262 which are supported by a stationary framework casting 264 of the machine.

Referring to FIG. 6b, rail 241 is carried by the end plate 257 of the slidable carriage and, as shown in FIG. 6a, the rail 270 is carried by the end plate 258. Therefore, a check sorting tray inserted in the machine is adapted to be carried by the slidable carriage and be positioned commensurately with the carriage. For positioning the slidable carriage upwardly and downwardly in the desired direction from its last set position to a newly selected position, the pair of gears 26 and 31 (FIG. 2) secured to the reversible shaft 27 meshes with their respective racks 30 and 32 which are secured to the respective side plates 255 and 256. Thus, as the gears 26 and 31 rotate clockwise and counterclockwise their engagement with their racks 30 and 32 will position the carriage and check sorting tray.

The check sorting tray 210 is held locked to the slidable carriage by means of a locking plate 268 (FIG. 4a) pivoted on a stud 269 carried by a plate 270 attached to the end plate 258.

As best shown in FIG. 12 said locking plate 268 bears against the tie rail 218 of the check sorting tray. When in such position the locking plate 268 is latched by a latch member 271 (FIG. 4a) pivoted thereon and hooking over a fixed block 272.

Reference to FIGS. 4a and 11 shows the provision of a pair of stop brackets 253 attached to side plate 256 for limiting the inward movement of the tray when placing it in the carriage. When locked in position the tray will be held between the locking plate 268 on the outside and the stop brackets 253 in the inside.

To release the tray for withdrawal from the machine locking plate 268 is first unlatched by rocking the latching member 271 so that plate 268 may be rocked 90° clockwise as viewed in FIG. 4a until it is latched by a second latch lever 273 pivoted at 274 upon the end plate 258. Said latch lever 273 will engage a latching plate 275 carried by the locking plate 268.

It is also desirable when unlocking the sorting tray carriage to prevent either contact operating levers 230 or bell cranks 231 from being struck by the tabs 229 of the partition plates 222 when the check sorting tray is withdrawn from the machine. To this end there is secured to a shaft 276 ((FIG. 5a) carried by the frame side plates of the check feeding unit, a handle 277 and sleeved to handle 277 is a lock lever 278. To shaft 276 there is secured a bail 279. When the handle 277 is rocked clockwise, the lock lever 278 is moved out of the path of the sorting tray and bail 279 will engage the series of levers 230 opening contacts 233 and rocking the levers 230 away from the tabs 229 of the partition plates 222. In a similar manner, also referring to FIG. 5a, to shaft 280, carried by the frame side plates of the check feeding unit, there is secured a second handle 281, lock lever 282, and a bail 279', which bail rocks the bell cranks 231 to move them to such a position that they open contacts 233 and move them out of the way of associated tabs 229 of the partition plates 222. Lock lever 282 also unlocks the sorting tray.

The check sorting tray may now be withdrawn from the machine and, as will now be explained, in connection with the wiring diagram of FIG. 15, the opening of the door 251 to do so will open contacts 252 which will prevent operation of the compartment selecting mechanism as long as the check sorting tray is out of its functioning position.

Partition separating mechanism carriage

A cross bar 283 has upstanding side plates 284 (FIG. 4a) which are fastened to the rails 260 and 261 and is, therefore, stationary with respect to the slidable carriage and the sorting tray. Cross bar 283 also has a pair of upstanding side plates 285 which carry rails 286, by means of which a second carriage may be reciprocated a limited extent.

Said second carriage is formed of side plates 287 and 288 which are tied together by end plates 289 and 290, it being noted in FIGS. 4a and 4b that said end plates are attached to the side plates 287 and 288 in such manner as to be mounted inclined downwardly to the right. This inclination is for the purpose of guiding reciprocable separators to be later described. The side plates 287 and 288 carry each a set of four rollers 291 (FIGS. 4a and 6a) between which rails 286 pass through. These rails as just described are stationary with respect to the check sorting tray and it will, therefore, be understood that the second slidable carriage just described may be slid up and down (FIG. 1) or to the left and right, as viewed in FIGS. 4a, 5a, 6a, a limited extent under control of a cam and operating means therefor to be presently described. The primary function of this sceond carriage is to carry and operate partition separators 292 and 293 (FIGS. 13, 13a) to effect a separation between two partition plates 222 or betwen checks already in a sorting compartment and an adjacent partition plate to thereby effect an opening in which the check to be sorted may be fed. When the check sorting tray is moved up or down to select a sorting compartment, as is shown in FIG. 13 one of a pair of separators 292 or 293 is moved upwardly to effect the desired penetration between two partition plates. It will be seen in FIG. 13 that the separator 293 has been so positioned. The separator plate 293 is used when the lower group 17 to 32 sorting compartments is selected to receive a check and the check passes out of the lower exit 101. The separator 292 is utilized when the upper group 1 to 16 of check sorting compartments is selected and the check passes out of the upper exit 111. The selected separator 292 or 293 is moved upwardly to effect the desired penetration while the second slidable carriage 287–290 is at its normal position.

Thereafter, as diagrammatically shown in FIG. 13a the second slidable carriage 287–290 is moved upwardly a lmited extent in the arrow direction shown in this figure so that the separator 93 moves all of the upper partition plates and checks therein against the action of springs 236 so as to effect an entrance for the check 295 shown in FIG. 13a as being fed out of the exit 101. After the check has been fed by the feeding rollers 97, 99 and is disposed in the compartment the separator 293 is now lowered, enabling the springs 236 to place all of the partition plates and checks therebetween under compression. The operation of the other separator 292 is exactly the same.

Holding means for partition plates

However, before either separator 292 or 293 is shifted to effect a check entrance an aligning means operates to seize a partition plate just below either separator 292 or 293, and hold it not only during the time the selected separator 292 or 293 is moved inward to provide a check receiving space but also while it is moved outward. To this end, dependent upon the particular sorting compartment in each of the two groups to be selected, a solenoid 300 or 301 (FIGS. 4a, 4b) is energized. Between side frames 287 and 288 are upstanding bracket plates 294 and 296 (FIG. 4a) secured by screws 295 to the stationary cross bar 283. Referring to FIG. 6a adjacent the separator 292 are two sets of aligners, each set being of the same construction. Each set consists of a jaw 302 (FIG. 6a) pivoted on stud 303 carried by the frame plate 294 and a cooperating jaw 304 pivoted on a stud 305 also carried by the frame side plate 294. Depending tails of the jaws 302 and 304 are interconnected by a spring 306, said spring acting to rock them in opposite directions so that the jaws will engage an aligning block 228 (FIG. 6b) of a partition plate. However, such upward movement is normally prevented by means of a stud 307 engaging the bottom edges of notches formed in each of the jaws 302 and 304. The stud 307 is carried by an arm 308 secured to a rock shaft 309 carried by frame side plates 294 and 296. It will be seen in FIG. 5a that secured to the rock shaft 309 is a depending arm 310 which has a pin connection to the core of solenoid 300. As long as the solenoid 300 is energized the arm 308 will be in the position shown in FIG. 6a, holding both jaws 302, 304 in downward position. As will be subsequently explained, when solenoid 300 is deenergized spring 306 will be then effective to rock the jaws 302, 304 upwardly to engage the blocks 228 of the pair of partition plates brought in alignment therewith. The above is a description of one of the aligning means cooperating with the upper series of sorting compartments. Also, as shown in FIGS. 4b, 6a, 6b and 11 and identified by reference numeral 312, 313 (FIG. 4b), a similar aligning means is provided and is similarly released by the solenoid 301. These two sets of aligning means will cooperate with the pairs of aligning blocks 228 of the upper partition plates which travel in alignment therewith.

The solenoid 301 when deenergized is adapted in a similar manner to release the two sets of aligning means 312 and 313 (FIG. 4b) so as to seize the pairs of blocks 228 of the partition plates of the lower series of sorting compartments. The solneoid 301 is normally energized but when deenergized it will be seen that the aligning jaws 314 and 315 (FIGS. 6b and 11) of the aligning means 312 and 313 will be urged by springs 316 upwardly so as to engage a block 228 of a partition plate.

After a partition plate has been aligned either separator 292 or 293 is now moved upwardly in a manner now to be described to effect the desired separation in the compartment to receive the oncoming check.

Contacts 400–402 controlled by aligning jaws

As will be subsequently explained, until either of the two sets of jaws is elevated to hold a partition plate both contacts are closed so as to prevent release of the check feed.

Referring to FIG. 6a reference numeral 400 shows one pair of such contacts and it will be seen that contacts 400 are normally closed when the jaws 302 and 304 are in their down position but when raised upwardly a pin 401 carried by a depending arm of jaw 304 will engage a contact plate of said contacts and open contacts 400.

Similarly, for the aligning jaws 314–315 (see FIG. 6b), contacts 402 are opened in the same manner, it being noted in FIG. 6b that the jaws 314–315 are also shown in downward position and said contacts 402 are accordingly closed. As a precautionary measure, if either of the sets of jaws 302–304 and 314–315 fails to raise completely and until either set does so singly, the respective contacts 400 and 402 will not be opened and in this case, as will be explained in connection with the cricuit diagram, the circuit to a check feed magnet 64 will be opened to prevent feeding of a check to a selected compartment upon depression of a manual check feed release bar.

Separator operating mechanism

The separator 292 comprises a cross plate 320 (FIGS. 4a and 6a) having four integral upstanding fingers 321, the outside ones being provided with rack teeth 322 meshing with respective gears 323 (FIGS. 13, 13a, 4a) fast on a reciprocating shaft 324, said shaft being carried by the side frames of the second carriage 287—288 which, it is recalled, is reciprocated a slight extent independently of the carriage which carries the check sorting tray. The meshing of the gears 323 with the rack teeth 322 holds the separator 292 against the end plate 289, and to prevent lateral shift of the separator 292 in its reciprocating movement there is provided adjacent the fingers having the rack teeth 322 guide blocks 325 (FIG. 4a) secured to the end plate 289. Thus, as the shaft 324 and gears 323 are reciprocated the separator fingers 321 will be moved upwardly and downwardly, said fingers having wedge-shaped ends 326 at their upper extremities as is shown in FIG. 5a in order to facilitate the entrance of the fingers in elements of the check sorting tray to provide the check receiving space.

Shaft 324 has secured at its end as shown in FIG. 5a a pinion 327 which is driven by a reciprocating segment rack 328 through a series of idler gears 329 and 330. Said segment rack 328 is pivoted on a stud 331 carried by the side frame 287 and is integral with a follower arm cooperating with a cam 332 secured to the shaft 75, said shaft also being, it will be recalled, journalled in the side frames 287 and 288 of said second carriage. The follower arm is urged by a spring 333 so that its roller will follow the contour of cam 332 as shaft 75 and cam 332 are rotated counterclockwise but the folower arm is normally unable to do so because an integral extension 334 of the segment rack 328 is latched by the armature 335 of a control magnet 336. When magnet 336 is energized the armature 335 will be attracted upwardly, freeing it from the extension 334 so that during the rotation of said cam 332 the follower arm will rock counterclockwise and segment rack 328 will, through idler drive gears 329 and 330, rotate shaft 324 clockwise, thereby raising the separator 292. While said fingers are held in such raised position due to the dwell of cam 332, the second carriage 287-290 is moved to the left as viewed in FIG. 5a to move the checks and partition plates to the left to provide the check receiving space, as will be presently described. The cam 332 then enables separator 292 to be restored.

The above is a detailed description of the operating mechanism for the separator 292 but a similar operating mechanism is provided for the separator 293. To this end shaft 75 has fast thereto a second cam 340 (FIG. 4a) like cam 332 and a follower arm 341 cooperating therewith and normally latched by a second control magnet 342. The segmental rack 343 of said follower arm 341 drives through similar idler gears a pinion 345 (FIG. 4b) secured to a reciprocating shaft 346 which is similar to shaft 324. Said shaft 346 carries gears 347 meshing with rack teeth of the outside fingers of the separator 293.

Therefore, separator 292 is reciprocated when control magnet 336 is energized and separator 293 when control magnet 342 is energized, each of said separators being associated with a group of sorting compartments.

*Contacts 405 and 406 controlled by respective segment racks 328 and 343 (FIGS. 5a, 6a, 6b)*

When segment rack 328 rocks downwardly to raise separator 292, it will strike the resilient blade of contacts 405 (FIG. 5a) and open them. When the other segment rack 343 raises the other separator 293 similar contacts 406 (FIG. 6b) are opened. If either separator 292 or 293 is not elevated or does not go up the full extent contacts 405 and 406 will remain closed, and in conjunction with closing of circuit breaker contacts 357 (FIGS. 4a and 6a) will close a circuit to give a signal of this improper operation. Mounted on shaft 75 is a cam 356 which controls circuit breaker contacts 357 in a well known manner.

*Reciprocating mechanism for carriage carrying separators*

The reciprocation of the second carriage 287-290 in order that a selected separator 292 or 293 provides the desired check receiving space is effected by cam 350 (FIGS. 4a and 6a) cooperating with a roller 351 carried by the block 352 secured to the stationary guide rail 286. The profile of the cam 350 is such that after the selected separator 292 or 293 has been raised upwardly a high portion thereof acting against roller 351 will move the second carriage to the left against the action of a spring 353, and then after the check has been fed into the selected compartment will enable said spring under the control of cam 350 to return the carriage to its normal position.

It will be recalled that gear 74 on shaft 75 is driven by gear 73 which is pivoted in the side frame 287 (see FIG. 4a) and said gear 73 has the flexible drive 71 thereto in order that shaft 75 may be rotated and the second carriage reciprocated at the same time.

*Check feeding path selecting means*

When lower compartments 17 to 32 (FIG. 6b) are selected the check will be fed out of the exit 101 to the selected compartment, whereas when upper compartments 1 to 16 (FIGS. 6a, 6b) are selected the check will be fed out of the exit 111 under control of selecting means now to be described.

When exit 101 is employed the check passes in the guide slot 193 (FIG. 9) to the slot provided by guide plates 194 and 195 and thus to exit 101. Guide slot 193 is provided partly by a switch chute block 365 (FIGS. 9 and 10) carried by a pair of arms 366 and 367 secured to a rock shaft 368. Attached to rock shaft 368 is a follower arm 370 (see FIG. 8) urged by a spring 371 so as to follow the contour of a cam 372. Secured to the shaft 84 is a gear 374 (FIGS. 7, 8 and 10) which drives a gear 375 attached to cam 372, both being pivoted on a stud 376 carried by the side frame 115. The follower arm 370 is provided with an extension 377 which is normally latched by the armature 378 of a selector magnet 379. If magnet 379 is deenergized, switch chute block 365 will be in the position shown in FIG. 9 so that the check will be fed by guide slot 193. When compartments 1 to 16 are selected, as will be described in connection with the wiring diagram, magnet 379 is energized, thereby removing armature 378 (FIG. 8) from extension 377, enabling follower arm 370 to follow the cam 372 as the latter is rotated. Shaft 368 will then be rocked counterclockwise so that switch guide block 365 will be moved to the left as viewed in FIG. 9, closing the guide slot 193. As the check is fed by rollers 93—94 (FIG. 9) guided by the plates 175, the leading edge will strike a curved surface 380 of the switch guide block 365, thereby diverting the check so that assisted by a curved guide plate 381 (FIG. 8) it will be fed to the pair of feed rollers 103—104 and then fed by the rollers 105—106, 107—108 and 109—110 to the exit 111. At the end of rotation of cam 372 the follower arm 370 (FIG. 8) will be in such position that it will again be relatched by armature 378, enabling the checks to be sorted in compartments 17 to 32 to be fed out of the exit 101.

*Full compartment signal*

It is desirable to give a signal whenever any compartment in either the upper or lower series is filled with a predetermined number of checks. To this end there is carried by the side frame 115 a bracket 385 (FIGS. 7 and 8) carrying a pivot pin 386 on which is pivotally mounted a bail 387 having an extension 388 engaging the resilient blade of contacts 389. Said bail 387 is provided with a foot 390 which is contacted by ears 391 (FIG. 12) carried by the partitions 222. As the upper series of compartments move upwardly and downwardly said ears 391 will retain the bail 387 in such position that the contacts 389 will remain open as long as a compartment of this series is not completely filled. Whenever a compartment is completely filled the partition plates 222 forming this compartment will be separated to such an extent that the measuring foot 390 will fall between the ears 391. The bail 387 urged by the resilient contact blade will then rock about pivot pin 386 so that extension 388 will enable the contacts 389 to close and thereby cause a light to be lighted which will indicate a full compartment condition for the upper series.

A somewhat similar arrangement is provided, as shown in FIG. 8, for the lower series of compartments and similarly a bail 395 will be rocked to close contacts 396 (see FIG. 7) and give a signal.

Check operated contacts

As previously described the check to be sorted is placed in chute 90 (see FIG. 1) and when projected down in the machine far enough it will engage a longitudinal cut of the feed roll 91 (FIG. 9) and shift the resilient blade of three spaced sets of contacts 398a, b, c (FIGS. 1, 15) to close such contacts when a check is square against them for a function to be described in connection with the wiring diagram.

Circuit diagram

The operation of the machine will now be described in connection with the circuit diagram of FIGS. 15a and 15b, wherein it will be seen that current is supplied to the machine circuits by lines 410 and 411 (FIG. 15b). When switch SW is closed motor 10 is set into continuous operation when door 251 has been closed to close contacts 252.

Mounted in the cabinet of the machine and in front of the operator is a keyboard comprising a series of depressible keys 412 and a motor bar 413 (see FIG. 1). There are thirty-two keys 412 corresponding to the number of compartments which are functionally arranged into two groups of sixteen each, the keys 412 designated 1–16 being associated with the upper compartments and keys designated 17–32 associated with the lower series of compartments and they each select the corresponding one. The keyboard construction is well known and is, therefore, only shown diagrammatically, wherein said keys 412 are shown to be slidably mounted in guide plates 414 and each has a shoulder adapted to be latched under a latching plate 415, each of said keys being depressed against the action of a spring 416 surrounding the key stem. The latching plate 415 is common to all of the keys in order that when one key is depressed the shifting of the latching plate 415 by the depression of an undepressed key by the operator will release the previously latched-down key. Therefore, when a key is depressed it remains latched down until freed by a second depressed key. The key stems carry at their lower ends insulated portions resting against the intermediate blade of normally open contacts 417 and normally closed contacts 418. When a key is depressed it closes contacts 417 and opens contacts 418 as shown for the No. 9 key.

When all of the keys 1 to 16 are undepressed, a circuit is completed from the line side 410 through contacts 252 and 440, then serially through all of the normally closed contacts 418 related to keys 1–16, thence by a wire 420 (FIG. 15b) to the R5 relay coil and wire 421 back to the line side 411. In the same manner, when keys 17–32 are undepressed, a circuit extends from the line 410, through contacts 252, switch S2, contacts 440, by a wire 422, thence serially through the normally closed contacts 418 associated with keys 17–32, wire 423 to R4 relay coil, wire 424 and 421, to the line side 411; thus with no keys depressed both R5 and R4 relays are energized. Obviously when a key in the group 1–16 is depressed it will open its contacts 418 to open the circuit of the R5 relay. In the same manner opening of contacts 418 by depression of the key in the group 17–32 will deenergize the R4 relay.

If no key in either of the groups 1–16 or 17–32 is depressed, it will be seen that all contacts 417 are open. Hence, a circuit will be completed if a key is depressed from line 410, through contacts 252, switch S2, contacts 440, through one of such closed contacts 417, and serially through contacts 233 of either series to either a wire 425 or 426. From the wire 425 the circuit extends through contacts R4–1 (FIG. 15a) and R2–1, R2H relay coil and R3PU coil to wire 421 to line side 411, or from wire 426, (FIGS. 15a, 15b) contacts 473 now closed, through R5–2 contacts (FIG. 15b) R1–1 contacts, R1H relay coil, R3PL relay coil, wire 421, to line 411. Hence, with no keys depressed no contacts 417 are closed and neither R3PU or R3PL is energized, and therefore contaces R3–1 controlled by R3PU and R3PL remain closed to complete a circuit from the line side 410, wire 427, through R3–1 contacts, (FIG. 15a) through both R1 and R2 relay coils and wires 424 and 421 to line side 411. Hence, even though R1 and R2 close their respective R2–1 and R1–1 contacts neither relays R3PU nor R3PL will be energized because no key has been depressed and no contacts 417 are closed.

It will be assumed the sorting tray is all the way down and no key has been depressed and it is desired to select pocket No. 9 by the depression of key No. 9, as shown in FIG. 15b. Upon depression of this key it opens related contacts 418 to deenergize R5 relay and closes related contacts 417, thereby placing the latter in the energizing circuit for the R3PU relay. Since contacts 233 for the No. 9 compartment are now closed because the sorting tray is not at the "9" position, closure of "9" contacts 417 will cause completion of a circuit from the line side 410, through contacts 252, switch S2, contacts 440, through all of the contacts 418 associated with keys 1–8, thence through contacts 417 associated with key No. 9 now closed, through certain contacts 233 associated with compartment No. 9, thence serially through other contacts 233 associated with compartments 10 to 16 inclusive, wire 425, R4–1 relay contacts now closed, R2–1 relay contacts now closed, R2H coil, R3PU coil and wire 421 to line side 411. Thereafter, a circuit is completed from line side 410, wire 427 (FIG. 15a) through R3–2 relay contacts, now closed, transfer contacts R1–2 now normal, R2–2 relay contacts now closed, clutch magnet 13 to the line side 411.

Since a key in the upper group is energized R4 relay is energized, causing R4–4 contacts to transfer to complete a circuit from line side 410, wire 427, through R3–2 contacts now closed, R4–4 contacts now transferred, solenoid 300 to line side 411. Also a circuit is completed from line side 410, wire 427, through transfer contacts R5–4 now normal, solenoid 301, to line side 411. It will be evident that when solenoids 300 and 301 are both energized the two sets of aligning means will be disengaged from the pair of aligning blocks 228 of the partition plates 222 with which they have engaged, and that when clutch magnet 13 is energized a clutch connection will be made to move the sorting tray carriage upwardly and when the No. 9 tab 229 strikes the related lever it will open the corresponding pairs of contacts 233, now opening the circuit to R3PU relay coil and R2H relay coil to deenergize both. Opening of contacts R2–2 will now deenergize clutch magnet 13 and opening of contacts R3–2 will deenergize solenoid 300. The deenergization of the latter will enable the aligning means to move upwardly and engage the pair of aligning blocks 228 of the No. 9 partition plate 222.

When the jaw 304 (FIG. 6a) of one of the sets of aligning means moves upwardly it will cause the opening of the contacts 400 (FIG. 15a), thereby deenergizing one of the coils of the differentially wound relay R8.

The operator now takes the check which is to be sorted in compartment No. 9 and places it in the chute 90 (FIG. 1), thereby placing it between feed rollers 91, 92 (FIG. 9) and closing the three sets of contacts 398a, b, and c (FIG.15b). A circuit is now completed from the line side 410, wire 427, through contacts 398c, R4-3 relay contacts now closed, magnet 379 to the line side 411. It will be recalled, referring to FIGS. 8 and 9, that energization of the magnet 379 will enable the chute switch block 365 to be so positioned that when the check is fed into the machine it will be fed out of the exit 111 which is always the case when keys Nos. 1-16 are selected. If the keys Nos. 17-32 are utilized R4-3 relay contacts would not have been closed and magnet 379 would not be energized and the check would be directed to the exit 101. Closure of contacts 398a and 398b completes a circuit through R3-3 relay contacts R4-5 relay contacts now closed, magnet 336 to line side 411. Energization of magnet 336 will enable subsequent positioning of the related separator 292 (see FIG. 5a.)

After placing the check in the chute 90 a motor bar 413 is depressed to cause the closure of its contacts 413a. Thus, a circuit will be completed from line side 410, wire 427, through contacts 398b, 398a, R8-1 relay contacts, contacts 413a, clutch control magnet 64 to the line side 411.

R8 relay is a differentially wound relay and will close its contacts R8-1 only upon the energization of one relay coil but not both coils.

Referring to FIG. 15a, each of the relay coils of R8 relay is in series with respective contacts 400, 402, both of which are normally closed when both sets of aligning jaws 302, 304 and 314, 315 are down. When one of the sets of aligning jaws is raised, the corresponding contacts 400 or 402 are opened to deenergize one relay coil and thus only the other relay coil of the differentially wound relay R8 is effective to close contacts R8-1. If both jaws of either of said jaws fails to raise, or both sets of jaws are raised, contacts R8-1 will remain open. Thus, card feed may not be initiated until one of the sets of jaws is in elevated position, and is prevented until the check tray has come to rest and is properly aligned.

Referring to FIG. 3, it will be recalled that energization of clutch magnet 64 effects the selective connection between the main drive and the gears which drive the check feeding mechanism and shaft 75 (see FIG. 5a). It will be recalled that when the magnet 336 (FIG. 5a) has been energized cam 332 (FIG. 5a) and its driven mechanism will cause separator 292 to be raised. Said separator will now engage the checks adjacent the No. 9 partition plate or the next higher partition plate and thereafter cam 350 (FIG. 6a) will cause the second carriage carrying separator 292 to be moved to the left. Said separator therefore moves all of the checks and partition plates above compartment No. 9 to provide an ample space to receive the check fed from the exit 111. When the check has been disposed in the compartment, cam 350 will enable the carriage to be restored to the right, at which time cam 332 enables separator 292 to be moved downwardly to normal position.

Reference to FIGS. 3 and 15b shows the provision of a safety switch having contacts 440 which are in series connection in the line 410 supplying current to the key control circuits for determining the position of the check carriage. These contacts are normally closed as shown in FIG. 3. Said contacts are mounted on the top side of frame 20 and are actuated by a lever 441 urged by a spring 442 to open contacts 440 but is normally prevented from doing so since the lower end of lever 441 rests against a pin 443 mounted on the gear 68, when the latter is in its home position.

In this position contacts 440 remain closed as shown but will be open when the pin 443 leaves the lever 441 which it will do when the check feed goes into operation. By this means the carriage drive will be held inoperative while check feeding is taking place.

Also in the event that separator 292 did not move completely upward contacts 405 (FIG. 5a) would remain closed so that when circuit breaker contacts 357 which close when either contacts 405 or 406 close, a circuit will be completed from line side 410, wire 427, through contacts 405, 406 in series and circuit breaker contacts 357 to a relay R9, to line side 411. R9 closes contacts R9a to complete a circuit from line side 410, wire 427, a switch S, signal light 430, R9a contacts, R9H coil, to line side 411. Signal light 430 remains lighted until switch S is opened. This signal will indicate to the operator the improper operation of the machine and he will accordingly rectify it.

It will be assumed that the tray is at the No. 9 position and one of the compartments in the group 17-32 is next to be selected. Since it is assumed that the sorting tray is now in such position that No. 9 compartment is adjacent exit 111 the sorting tray must for certain compartments be moved downwardly so as to correlate exit 101 with one of these compartments. Assuming that the No. 18 compartment is to be selected, key No. 18 will be depressed, releasing the No. 9 key to cause, when its contacts 418 close, the energization of the R5 relay. Opening of contacts 418 by No. 18 key causes the R4 relay to be deenergized. When key No. 18 closes its contacts 417, a circuit is extended through contacts 233 associated with compartments No. 18 and No. 17, by wire 426, contacts 473, through R5-2 contacts, R1-1 contacts now closed, R1H relay coil and R3PL relay coil to line side 411. Energization of the latter closes its contacts R3-2, completing a circuit from line side 410, wire 427, through contacts R3-2 now closed, through the now transferred contacts R1-2, clutch magnet 14 to line side 411. Energization of clutch magnet 14 now causes the sorting tray to be moved downwardly.

The circuit is also completed from the line side 410, wire 427 through R3-2 contacts now closed, through R4-4 contacts now transferred, solenoid coil 300 to line side 411. A circuit is also completed from the line side 410, wire 427 through R5-4 contacts now normal, solenoid coil 301 to the line side 411. Solenoid coils 300 and 301 now both being energized, both sets of aligner jaws 302, 304 and 314, 315 will be moved out of engagement with aligning blocks 228 and are thus held in this position during the movement of the carriage. The sorting tray carriage now moves downwardly and when No. 18 tab 229 strikes the related lever 231 it will open the corresponding contacts 233, now opening the circuit to the R3PL and R1H relay coils.

Deenergization of the R3 relay causes the opening of the R3-2 contacts and deenergization of the R1 relay causes the transfer of R1-2 contacts, both of these contacts opening the circuit to the clutch magnet 14, bringing the carriage to a stop. Opening of contacts R3-2 will deenergize solenoid 301 and the latter will enable the aligning means to move upwardly and engage the pair of aligning blocks 228 of the No. 18 partition plate 222. However, the circuit through R5-4 contacts to solenoid 301 will be maintained closed so as to retain the energization of solenoid 301.

In the same manner the check to be sorted in compartment No. 18 is placed in the chute 90 and since R5-3 relay contacts are now closed a circuit is completed from line side 410, wire 427 through contacts 398b, 398a, R3-3 relay contacts now closed, R5-3 contacts now closed, magnet 342, to line side 411. This magnet similarly enables the elevation of the separator 293 (FIG. 6b) to engage checks of the partition plate above the No. 18 partition plate so that when it is shifted to the left it will provide a check receiving space for the check to be fed out of the exit 101, which now happens because the selector magnet 379 is not energized when keys 17-32 are employed.

In the event that separator 293 did not move upwardly associated contacts 406 (FIG. 15a) would remain closed so that when circuit breaker contacts 357 close a circuit will be completed to energize R9 relay to cause the signal light 430 to be lighted, as previously described for contacts 405.

It is pointed out that when keys 1–16 are employed the sorting tray does not always move upwardly and that when keys 17–32 are used the sorting tray does not always move downwardly as would be implied from the above examples. In some instances, as will be presently explained, the sorting tray must be moved either upwardly or downwardly when compartments within the group 1–16 or within the group 17–32 are selected or from group to group. Furthermore, the sorting carriage always remains in its last position of adjustment.

Assuming that the sorting tray carriage was at such position that the No. 9 sorting pocket was correlated with chute 111 and compartment No. 8 was to be selected next, it will be obvious that this will require a downward movement of the sorting tray carriage and this direction of movement should also be carried out if compartments 1–7, which are lower in serial number order, were also selected. With compartment No. 9 at check receiving position and key No. 9 now depressed associated contacts 418 and contacts 233 related to compartment 9 will be open. Therefore, if a key lower in serial number order was depressed, such as key No. 8, closure of its contacts 418 will complete a circuit from the line 410 through all contacts 418 for keys 1–7, through contacts 417 for the No. 8 key, for example, and thence through normally closed contacts 233 associated with compartments 8, 7, 6–1, through contacts 474 now closed, through R4–2 relay contacts now closed, R1–1 relay contacts now closed, R1H and R3PL relay coil to line 411. R4 relay is energized to close contacts R4–2 because none of the keys Nos. 17–32 is depressed. As was previously explained, energization of the R3PL relay coil will cause energization of clutch magnet 14 and the tray will be moved downwardly to the No. 8 compartment position.

However, if the No. 9 key is now depressed or any key higher in serial number order, such as the No. 10 key, the circuit from closed contacts 418 associated with No. 10 key would extend through all normally closed contacts 233 associated with compartments 10–16, thence through R4–1 relay contacts, R2–1 relay contacts, R2H and R3PU relay coil to line 411. In this instance the sorting carriage tray would be moved upwardly.

A similar operation is effected for compartments 17–32 so that if a compartment is at a certain position, depression of a key in a lower serial number order than that depressed will cause the carriage to be moved downwardly and if a key was depressed which was higher in serial number order than the one already depressed, the carriage would be moved upwardly to select such compartment.

In the same way the sorting carriage tray moves upwardly and downwardly from a position in one group to a new position in another group.

Full compartment signal circuits

Whenever a compartment in the lower group or in the upper group is filled with a predetermined number of checks respective contacts 396 or 389 will be closed, as described in the section "Full Compartment Signal." Closing of either of said contacts completes a circuit from line side 410, wire 427, through either contacts 396 or 389, wire 428, pickup coil P of R9 relay, to line side 411. As previously described R9a contacts complete a circuit to signal light 430.

Full group of compartment signal circuits

While the full compartment signal is adequate to a certain extent it is desirable to provide means to detect abnormal expansion of either of the sixteen upper or sixteen lower compartments as a unit which would bring either series out of range of the respective check delivery chutes 111 and 101, even with the tray in the lowest position.

A suitable detecting means now to be described is shown in FIGS. 3, 6a, 6b and 11.

At the left in FIG. 6a is shown a pair of normally open contacts 460 associated with the upper compartments and at the right in FIG. 6a a pair of normally open contacts 461 associated with the lower compartments.

Secured to the channel-shaped bar 214 on the right side of the sorting tray are four insulating blocks 462 (FIGS. 6a and 6b), arranged at spaced intervals. To these are secured two metal bars 463, 464 running the full length of the tray and to these in turn are secured the contact blades of contacts 460, 461. The same blade of each pair is connected to bar 463, and the same other blades are connected to bar 464.

Angle pieces 465 of insulating material secured to the uppermost partition plates 222 of each group are adapted as the compartments fill up to approach a blade of respective contacts 460, 461 so that when the separator 292 or 293 associated with the selected group is moved upwardly to provide the space for the entry of a new check, it will cause the top partition plate 222 of the related group to close either contacts 460, 461. As shown in FIG. 15a, closure of either contacts 460, 461 completes a circuit from line side 410, wire 427, wire 428, to energize signal relay R9, and to cause the lighting of the signal light 430, as explained before.

For making continuous electrical contact to contacts 460, 461 there is provided a pair of collector blades 466 carried by side frame 20 in an insulating manner, and which blades 466 continuously wipe the metal bars 463, 464 to make electrical connection irrespective of the position of the tray.

Circuits controlled upon removal of tray

It will be recalled that when the tray is to be removed door 251 is opened and in doing so opening contacts 252 (FIG. 1) which are pressed close when the door is closed. Contacts 252 (FIG. 15b) are in the line side 410 and when opened disconnect line side 410 from the motor circuit and principally the key controlled compartment selecting circuits. However, the signal, clutch and solenoid circuits including circuits for R1 and R2 magnets are not affected. Thus, a circuit is completed from line side 410, wire 427 through R4–4 and R5–4 contacts to respective solenoids 300 and 301. Because R3–2 contacts are open a circuit will not be completed from wire 427 to either clutch magnets 13 and 14. Both clutches are now open and both sets of aligning jaws 302—304 and 314—315 are held in their down or disengaged position, leaving the carriage free to roll down under the restraining action of torsion spring 33, to its bottom position, where it strikes a stop 435 (FIGS. 4b and 12).

Start operation after placing empty tray in carriage

It will be remembered that the new tray is to be entered with the carriage in its down position, and that while the door 251 is open to open contacts 252, both clutch magnets 13 and 14 are energized. It should also be noted that with an empty tray, or even with one fairly full after emptying out some particular pocket, the compartment tabs 229 are generally below their related contact levers 230 or 231 in this down position. To move a tray to a selected key position special means may be provided to start the carriage on its way upward, and a preferred construction will now be described.

Normally an upward or downward movement is determined with relation to a previously depressed key 412 and its associated contact lever 230 or 231, the latter being held in their operated position with contacts 233 open, in the last position occupied by the tray.

A side view of the special feature is shown in FIG. 5b, a plan view in FIG. 4b and an end view in FIG. 12. It is seen to consist of two parts, a contact unit and an electromagnet control unit. Both these units are secured to stationary members of the machine, the contact unit to the side rail 261 near its end, and the magnet unit to the end portion of stationary frame 264.

The contact unit consists of a bracket 470 secured to side rail 261 on which is pivotally mounted a U-shaped contact lever 471, and beside it to the right, as seen in FIG. 5b, a conventional contact strap assembly, with the upper end secured to the holding bracket 470. Screwed into the end bar 257 of the traveling carriage is a stud 472 which engages the contact lever 471 when the carriage is in the down position, to open the normally closed contacts 473, 474.

The magnet unit is seen to consist of a frame 475 attached to end portion of frame 264 carrying on its upper side a pivotally mounted armature 476 normally urged clockwise by the spring 477 at the right, and counterclockwise by the energization of the magnet 478 at the left. Magnet 478 will be energized as will be explained when a key 412 is depressed, and the right end of armature 476 will thereby be raised into the path of the contact lever 471, preventing lever 471 from returning to normal and holding the contacts 473, 474 open, even after the carriage has moved upward. When the magnet 478 is later deenergized, after the carriage has been stopped in some upper position, the armature 476 will be rocked clockwise by spring 477, freeing the contact lever 471 to move to the left, and permit closing of contacts 473, 474.

A review of the circuits (FIGS. 15a, 15b) shows that the up and down movement of the carriage is controlled initially by energization of either the R4 relay magnet or R5 relay magnet. With a key 412 depressed in the upper group (1–16), the R4 relay is energized, and with a key 412 depressed in the lower group (17–32), the R5 relay is energized. It is also seen that the up movement of the carriage is governed by the closure of either the R4–1 or R5–1 contacts, and the down movement by closure of either the R4–2 or R5–2 contacts.

Reference to FIG. 15b shows that contacts 473, 474 are in series with the circuit leading to contacts R5–2 and R4–2. In FIG. 12 it will be seen that two sets of contacts 473 and 474 are provided, contacts 474 being in series with the R4–2 contacts and contacts 473 in series with the R5–2 contacts. In FIG. 15b it will be seen that the energization of magnet 478 is controlled by the normally open R3–4 contacts.

When the tray is placed in the machine the carriage is in its down position, holding the contacts 473, 474 open as already explained. The door 251 is then closed, a selected key 412 is depressed, and the special switch S2 in line 410 closed if previously opened. The carriage will start moving upward by reason of the closure of contact points R5–1 or R4–1, the circuits to points R5–2 and R4–2 being broken by the open contacts 473, 474.

After the key has been depressed the R3 magnet will be energized, closing the R3–4 contact to energize magnet 478, rocking its armature 476 and preventing the contact lever 471 from returning to normal, and thereby holding the contacts 473, 474 open, even after the stud 472 in the lower end of the carriage has moved up away from the contact lever 471.

The carriage will continue its upward travel until the particular contacts 233, associated with the depressed key, are engaged by the corresponding compartment tab 229 to stop the carriage in that position in the usual manner. When this happens, the R3 magnet is deenergized, the R3–4 contacts open to deenergize magnet 478 and contact lever 471 returns to normal permitting its contacts 473 and 474 to close, thus restoring the two circuits in the downward movement of the carriage to normal operation. The special contacts 473, 474 now being restored to normal, are ready for use again at a later time.

*When no key is depressed*

The keyboard may happen to be cleared by a slight depression of one key to release another fully depressed and latched key when the current is fully on; when certain circuits are opened as when the door 251 is opened to open contacts 252; when the special switch S2 is opened, or when the current is fully off. These cases will be considered separately.

With the current fully on, both the R4 and R5 magnets will be energized, together instead of separately as when a key is depressed, and all contacts in both the up and down circuits will be closed. No current will flow, however, in these circuits because with no key down, no electrical circuit is made with either of the two series of contacts 233. The R3 magnet will therefore not be energized, and the R3–2 contacts (FIG. 15a) will not be closed. No current will, therefore, flow through the clutch magnets 13 or 14, even though the R1–2 and R2–2 contacts are closed.

With the R4–4 and R5–4 contacts both transferred current will not be supplied to either solenoids 300 and 301 and both sets of aligner jaws will be upward. The carriage will remain in its previous selected position.

When either door 251 or the special switch S2 is opened, current will be cut off from the two series of key contacts 418 and neither of the magnets R4 and R5 will be energized. Current will, therefore, not flow through either the up or down circuits and both clutch magnets 13 and 14 will remain deenergized. Current will be supplied, however, to both solenoids 300, 301 for holding the jaws 302, 304 and 314, 315 in their withdrawn position, and leaving the carriage free to roll by gravity to its lowest position.

When the current is fully cut off with no keys 412 depressed, the clutch magnets 13 and 14 remain deenergized, the aligner jaws are released to their upward aligning position, and the carriage will roll down until stopped by the nearest set of aligning jaws. The action, therefore, is the same as with no keys depressed and the current fully on.

In starting up again, when depressing a key after the keyboard has once been cleared, the action will depend upon where the carriage was last left standing. If it stands in the same group as the newly depressed key, the carriage will move to the new position in the regular manner. If it stands in the other group, it will either move to the new key position directly, or roll to the bottom and then up again to the new position. The action is the same as when changing from one group of keys to the other, as was described.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed it:

1. In a sorting machine, the combination of a carriage carrying a sorting tray having a group of compartments demarcated by separable partition plates, feeding means for feeding records to selected compartments, a plurality of keys, one for each compartment, means under control of said keys and said partition plates and operable in accordance with the last compartment selected for moving said carriage in either of two directions to operatively associate a selected compartment of the tray with the feeding means, selective means controlled by said keys for determining in accordance with the key utilized which direction said carriage is to be moved to correlate the selected compartment with the record feeding means, and means for separating adjacent partition plates to form a record receiving compartment.

2. In a sorting machine, the combination of a sorting tray having two groups of compartments, feeding means for feeding records to selected compartments and having two exits, one for each group of compartments, a plurality of groups of keys, one group for each group of compartments, means under control of said keys and operable in accordance with the last compartment selected for moving said tray to operatively associate a selected compartment with the exit for that group of compartments, and selective means controlled by said keys for determining in accordance with the group of keys utilized which exit is to be effective for delivering the record to the selected compartment.

3. In a record sorting machine, a sorting tray having movable dividing partition plates to form two groups of compartments, adjacent ones in either group being separated to form a compartment, a plurality of keys for predetermining the particular partition plates to be separated to form related compartments, said keys being divided into two groups, feeding means for feeding records to selected compartments and having two exits, one exit for each group of compartments, two direction moving means for said tray, and means under control of said keys and partition plates to cause said moving means to move said tray in either of two directions from its last position to operatively associate the selected compartment with the exit for that group of compartments.

4. In a record sorting machine, a storing tray having movable dividing partition plates adjacent ones being separated to form a compartment, a plurality of keys for predetermining the particular partition plates to be separated to form a compartment, feeding means for feeding records to selected compartments, means for holding one partition plate, means for moving the adjacent partition plate to form a compartment, two direction moving means for said tray, and means under control of said keys and partition plates to cause said two direction moving means to move said tray in the desired direction from its last position to operatively associate the partition plates forming the compartment selected by a key with the holding means and partition plate moving means.

5. In a record sorting machine, a sorting tray having movable dividing partition plates adjacent ones being separated to form a compartment, a plurality of keys for predetermining the particular partition plates to be separated to form a compartment, means for holding one plate, means for moving the adjacent plate to form a compartment, feeding means for feeding records to selected compartments formed by the separation of adjacent partition plates, moving means for said tray, means under control of said keys and partition plates to cause said tray moving means to move said tray to operatively associate the partition plates of the selected compartment with said holding means and partition plate moving means, means to initiate the operation of said feeding means and said partition plate moving means, and interlock means controlled by said holding means to prevent the operation of said initiating means until said holding means has held a partition plate of the selected compartment.

6. A sorting apparatus for sorting records comprising a plurality of separator elements arranged in parallelism, adjacent ones being movable relative to one another to provide a plurality of compartments for reception of records having corresponding classifications, a carrier carrying said separator elements, electromagnetic means to hold a selected separator element, separator means for moving the adjacent separator element and records between said selected separator element and said adjacent separator element to provide a record receiving space, a plurality of contact devices each operated by a respective separator element, means for moving said contact devices and carrier relative to each other until a predetermined separator element operates the associated contact device, and said adjacent separator element is operatively associated with said separator means, a plurality of individual compartment selecting contact means, and a circuit completed under control of said individual compartment selecting contact means and the operated contact device to energize said electromagnetic means.

7. A sorting apparatus for sorting records comprising a plurality of separator elements arranged in parallelism, adjacent ones movable relative to one another to provide a plurality of spaces for reception of records having corresponding classifications, a movable carrier carrying said separator elements, electromagnetic means to hold a selected separator element, separator means for moving the adjacent separator element and records between said selected separator element and said adjacent separator element, contact devices adapted to be successively engaged by said separator elements as said carrier is moved, selecting means for moving said carrier to a predetermined position to operatively associate adjacent separator elements forming a compartment with respective separator means and electromagnetic holding means, circuit means completed by said contact devices to energize said electromagnetic means when a separator element of a selected record receiving space engages said contact devices, means for delivering the record into the selected record receiving space formed by the separation of said separator elements, and operating means for effecting a timed sequential operation of said separator means and said delivery means to first cause the former to move one of said separator elements and thereafter the operation of the delivery means.

8. In a record sorting machine of the type having a tray forming compartments by separable partition plates, means for supporting said partition plates on said tray to provide for separation of adjacent partion plates, resilient means to urge said partition plates together to clamp sorted records therebetween, a group of keys, means under control of said keys to effect the differential position of said tray to position the adjacent partition plates of a related compartment at a common record inserting position, means to effect the separation of adjacent partition plates against the action of said resilient means to form a compartment, and manually controlled means for causing said separating means to be inserted between adjacent partitions and thereafter causing the withdrawal of said separating means from said partition plates after a record inserting operation to enable said resilient means to urge said partition plates together to clamp the records inserted in the compartments, the position of a compartment after receiving a document being changed with respect to the tray in addition to at least an adjacent compartment as a result of a compartment receiving the document.

9. A machine according to claim 8 which includes feeding means for inserting records in between separated partition plates, and said manually controlled means initiates the operation of said feeding means.

10. In a record sorting machine, a carrier having a group of compartments formed by separable independently movable partition plates, means for separating all partition plates at one side of a compartment for the remaining plates to expand such compartment, selecting means to select the particular adjacent plates to be separated by said separating means, and measuring means operable after the operation of said separating means for sensing the extent of separation of adjacent partition plates for determining whether the separation of adjacent partition plates forming any compartment exceeds a predetermined width.

11. In a record sorting machine, a sorting tray having a group of compartments formed by separable partition plates, means for separating adjacent partition plates to form a compartment, selecting means to select the adjacent plates to be separated by said separating means, measuring means operable after the operation of said separating means and engageable with the separated partition plates for determining whether each compartment exceeds a predetermined width, and mean controlled by said measuring means for signaling such occurrence.

12. In a record sorting machine having separable partition plates, adjacent ones being separated to form a compartment, means for separating adjacent partition plates to form a compartment, means for feeding records into said compartments including a record delivery chute for delivering records at a position where adjacent partition plates are separated, one of said partition plates being variously located on the tray and at a certain position when the records sorted in said compartments have fully expanded the compartments, and means engageable with said one partition plate for indicating that said compartments have fully expanded and have brought adjacent partition plates out of operative relation with said record delivery chute.

13. In a record sorting machine, a sorting tray having movable partition plates, adjacent ones being separated to form a compartment, means for feeding successive records to be sorted in said compartments which may cause a compartment to expand beyond a predetermined width, means for separating adjacent partition plates to form a compartment, and measuring means engageable with said partition plates for sensing their extent of separation for determining whether a compartment has expanded beyond a predetermined width.

14. In a record sorting machine, a sorting tray having movable partition plates, adjacent ones being separated to form compartments of two groups, means for separating adjacent partition plates in either group to form a compartment, means for feeding records into said compartments which may cause said compartments in either group to expand beyond a certain width, selecting means to select the adjacent partition plates of a selected group to be separated by said separating means, a plurality of measuring means, one for each group and operable after the operation of said separating means and each engageable with said selected adjacent plates for determining whether a compartment formed in either group has expanded beyond said predetermined width.

15. In an apparatus for sorting forms, the combination of a plurality of adjoining partition elements each movable independently of the other to define between adjacent ones of said elements respective compartments having two movable end walls, means for selecting which compartment is to receive a form, means responsive to operation of said selecting means to move more than one of said partition elements to expand the selected compartment to facilitate its receipt of such form, and means operative after receipt of such form to contract the selected compartment by restoring substantially to their former positions those elements which were so moved during such expansion.

16. Apparatus for sorting forms, comprising a plurality of partition elements arranged side-by-side and movable independently of each other to provide expandable form-receiving compartments therebetween, means for selecting which compartment is to receive a form, means responsive to operation of said selecting means to move all those certain elements at one side of the selected compartment in unison one way relative to the remaining elements to expand the selected compartment to facilitate receipt of the selected form, means for guiding the selected form to the selected compartment, and means operative after such form is received to move said certain elements in unison the opposite way to contract the selected compartment and compact said elements to a minimum overall dimension which varies according to the number of forms sandwiched between adjacent ones of said elements.

17. Apparatus for sorting forms, comprising a plurality of partition elements arranged side-by-side and movable independently of each other to provide expandable form-receiving compartments therebetween, means for selecting which compartment is to receive a form, means responsive to operation of said selecting means and including holding means to effectively hold all those certain elements at one side of the selected compartment stationary and also including advancing means to move all the remaining elements away from said certain elements to expand the selected compartment to facilitate receipt of the selected form, means for guiding the selected form to the selected compartment, and means operative after such form is received to free said elements from the actions of said holding means and advancing means, and means operative when said advancing means is freed to compact said elements to a degree where adjacent elements operatively abut each other except as held spaced by those forms sandwiched and clamped between respective adjacent elements.

18. Apparatus for sorting forms comprising a plurality of partition elements arranged side-by-side and each movable independently of the other to define form-receiving compartments between adjacent elements, a movable carrier, means supporting said elements in said carrier for movement by and relative to said carrier, means for expanding a selected compartment by moving all elements at one side of such compartment relative to the remaining elements, selecting means for moving said carrier to a position where said expanding means is rendered effective to move only those elements at said one side of the selected compartment, and means for directing the selected form into the selected compartment.

19. In an apparatus for sorting forms, the combination of a plurality of expandable compartments defined between normally abutting independently movable partition elements, means for directing a form to a selected compartment, separator means including means for moving all partition elements at one side of the selected compartment in unison away from those elements at the opposite side of such compartment to expand the latter to receive the form, and means for initiating operation of said separator means when those partition elements defining said selected compartment are positioned adjacent the form directing means.

References Cited in the file of this patent

UNITED STATES PATENTS

| | | |
|---|---|---|
| 785,465 | Armijo | Mar. 21, 1905 |
| 1,298,971 | Lasker | Apr. 1, 1919 |
| 1,533,698 | Cox | Apr. 14, 1925 |
| 1,709,430 | Hentzschel | Apr. 16, 1929 |
| 1,802,315 | Barta | Apr. 21, 1931 |
| 2,132,231 | Dunser | Oct. 4, 1938 |
| 2,146,695 | Brand et al. | Feb. 7, 1939 |
| 2,785,800 | Furman et al. | Mar. 19, 1957 |